(12) United States Patent
Takamura et al.

(10) Patent No.: US 6,275,148 B1
(45) Date of Patent: Aug. 14, 2001

(54) VEHICLE WHEEL INFORMATION SUPPLY DEVICE AND WHEEL TIRE ABNORMALITY INDICATING DEVICE

(75) Inventors: Yoshinori Takamura, Toyota; Takayuki Tsuchiya, Okazaki; Junzo Ooe, Aichi-ken; Mitsuyuki Banno, Toyota; Mitiya Katou, Ichinomiya, all of (JP)

(73) Assignees: Toyota Jidosha Kabushiki Kaisha, Aichi-Ken; Pacific Industrial Co. Ltd., Gifu-Ken; Denso Corporation, Aichi-Prep, all of (JP)

( * ) Notice: Subject to any disclaimer, the term of this patent is extended or adjusted under 35 U.S.C. 154(b) by 0 days.

(21) Appl. No.: 09/466,073

(22) Filed: Dec. 17, 1999

(30) Foreign Application Priority Data

Dec. 25, 1998 (JP) .................................................. 10-370413
Aug. 9, 1999 (JP) .................................................. 11-225421

(51) Int. Cl.⁷ .......................... B60C 23/00; B60C 23/02
(52) U.S. Cl. .......................... 340/442; 340/443; 73/146.5
(58) Field of Search ................................. 340/442, 443, 340/444, 445, 447, 461, 525; 73/146.5, 146.4; 116/34 R; 180/197, 290

(56) References Cited

U.S. PATENT DOCUMENTS

| | | | |
|---|---|---|---|
| 5,473,938 | * 12/1995 | Handfield et al. | 73/146.5 |
| 5,540,892 | * 7/1996 | Handfield et al. | 73/146.5 |
| 5,581,023 | * 12/1996 | Handfield et al. | 73/146.5 |
| 5,585,554 | * 12/1996 | Handfield et al. | 73/146.5 |
| 5,600,301 | 2/1997 | Robinson, III | 340/442 |
| 5,602,524 | 2/1997 | Mock et al. | 340/447 |
| 5,717,376 | 2/1998 | Wilson | 340/442 |
| 5,774,048 | 6/1998 | Achterholt | 340/447 |

FOREIGN PATENT DOCUMENTS

| | | |
|---|---|---|
| 5-13802 | 2/1993 | (JP) . |
| 8-507735 | 8/1996 | (JP) . |
| 8-227492 | 9/1996 | (JP) . |
| 10-504783 | 5/1998 | (JP) . |
| 10-508264 | 8/1998 | (JP) . |

* cited by examiner

*Primary Examiner*—Jeffery Hofsass
*Assistant Examiner*—John Tweel, Jr.
(74) *Attorney, Agent, or Firm*—Oliff & Berridge, PLC

(57) ABSTRACT

A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of the wheel state detector, a transmitter for transmitting the wheel information, and a receiver which receives the wheel information transmitted by the transmitter, the wheel state detector, the wheel information generator and the transmitter being disposed on the wheel while the receiver being disposed on a body of said vehicle, wherein the wheel information generator is capable of selectively generating different kinds of wheel information having respective different volumes, and at least one of the wheel information generator and the transmitter operates in a manner depending upon at least one parameter indicative of the state of the wheel, which at least one parameter is detected by the wheel state detector.

32 Claims, 20 Drawing Sheets

FIG. 11
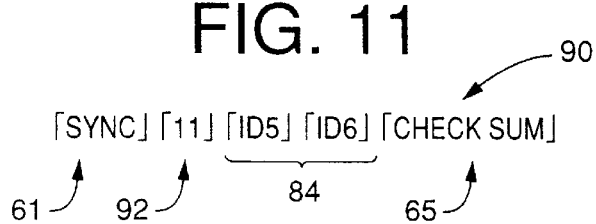
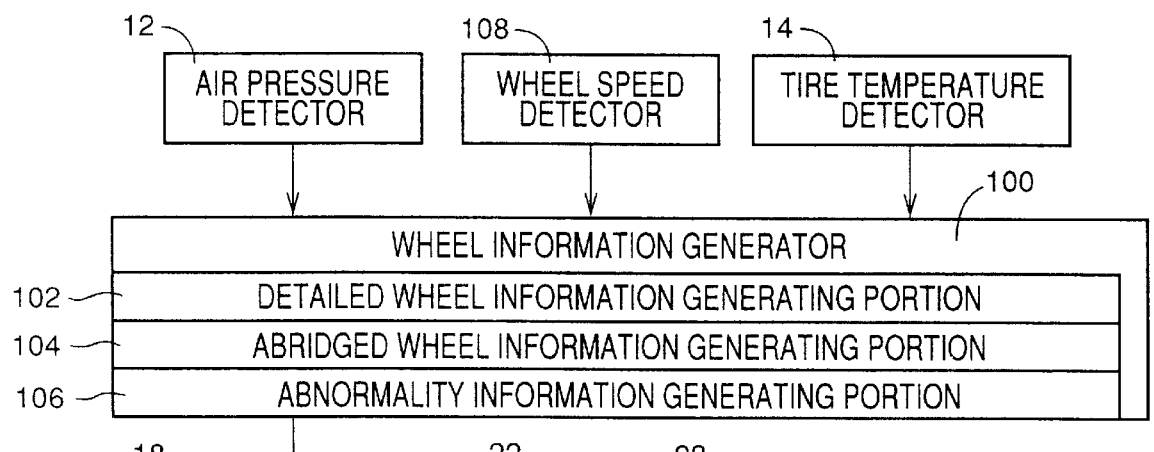
FIG. 12

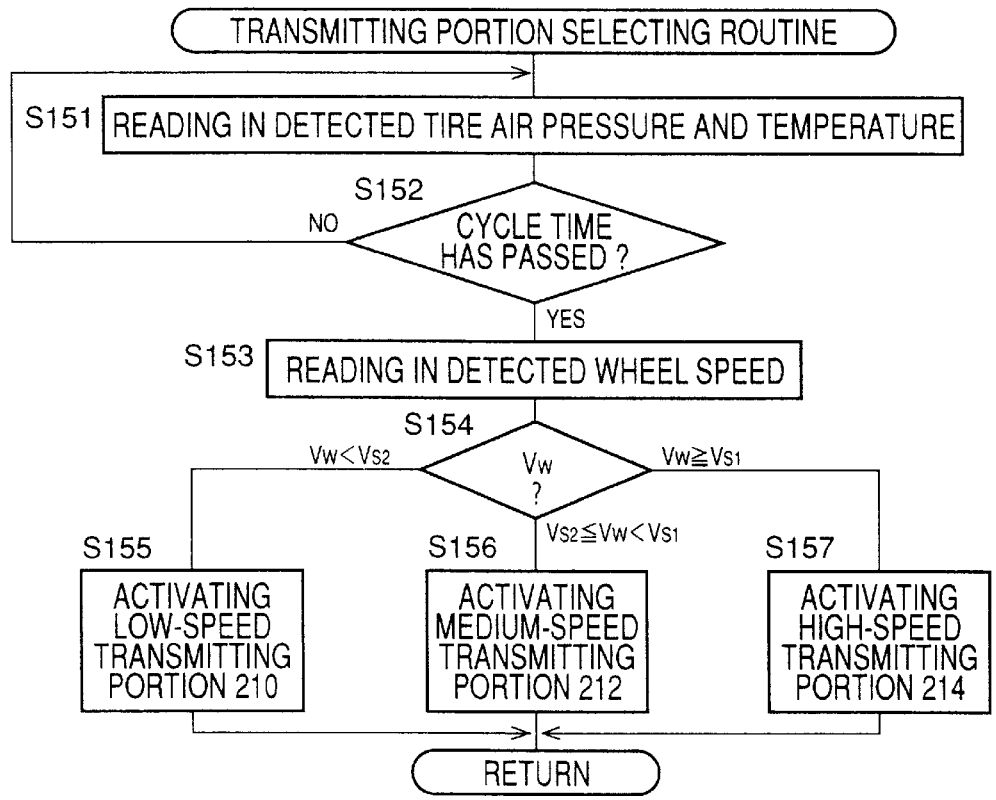

FIG. 23

| ORDER OF GENERATION | LOW SPEED | MEDIUM SPEED | HIGH SPEED |
|---|---|---|---|
| 1 | LOW-SPEED WHEEL INFORMATION GENERATING PORTION | MEDIUM-SPEED WHEEL INFORMATION GENERATING PORTION | HIGH-SPEED WHEEL INFORMATION GENERATING PORTION |
| 2 | MEDIUM-SPEED WHEEL INFORMATION GENERATING PORTION | HIGH-SPEED WHEEL INFORMATION GENERATING PORTION | MEDIUM-SPEED WHEEL INFORMATION GENERATING PORTION |
| 3 | HIGH-SPEED WHEEL INFORMATION GENERATING PORTION | LOW-SPEED WHEEL INFORMATION GENERATING PORTION | LOW-SPEED WHEEL INFORMATION GENERATING PORTION |
| 4 | LOW-SPEED WHEEL INFORMATION GENERATING PORTION | MEDIUM-SPEED WHEEL INFORMATION GENERATING PORTION | HIGH-SPEED WHEEL INFORMATION GENERATING PORTION |
| | ⋮ | ⋮ | ⋮ |

VEHICLE WHEEL INFORMATION SUPPLY DEVICE AND WHEEL TIRE ABNORMALITY INDICATING DEVICE

This application is based on Japanese Patent Application Nos. 10-370413 filed Dec. 25, 1998 and 11-225421 filed Aug. 9, 1999, the contents of which are incorporated hereinto by reference.

BACKGROUND OF THE INVENTION

1. Field of the Invention

The present invention relates to a vehicle wheel information supply device for supplying wheel information relating to a state of a wheel of a vehicle, which device includes a transmitter disposed on the wheel and a receiver disposed on the body of the vehicle. The present invention is also concerned with a wheel tire abnormality indicating device which includes such a wheel information supply device, and an indicator operated in response to an output of the vehicle wheel information supply device, to indicate an abnormality of a tire of the vehicle wheel.

2. Discussion of the Related Art

JP-U-5-13802 discloses an example of such kind of vehicle wheel information supply device in the form of a tire air pressure information supply device adapted to supply tire air pressure information indicating whether an air pressure in a tire of a wheel of an automotive vehicle is normal or not. This tire air pressure information supply device includes an air pressure detector disposed on the vehicle wheel to detect the air pressure of the wheel tire, an air pressure information transmitter also disposed on the vehicle wheel to transmit the tire air pressure information, and an air pressure information receiver disposed on the vehicle body to receive the tire air pressure information transmitted by the air pressure information transmitter. Based on an output of the air pressure detector, the air pressure information transmitter intermittently transmits a pulse signal of a predetermined pattern when the output indicates that the tire air pressure is normal, and continuously transmits a pulse signal of another predetermined pattern when the output indicates that the tire air pressure is abnormal. Thus, the air pressure information transmitter in the tire air pressure information supply device described above is adapted to transmit a pulse signal in different patterns where the tire air pressure is normal and where it is abnormal.

The air pressure information receiver disposed on the vehicle body includes a receiving portion including an antenna. The air pressure information transmitter disposed on the vehicle wheel is rotated with the vehicle wheel, so that a distance between this transmitter and the receiving portion of the air pressure information receiver periodically changes, causing a periodic change in the amplitude or intensity of the signal received by the receiver. When the distance is relatively large, the signal-to-noise ratio (SN ratio) is relatively low, and the receiver may not receive the signal whose intensity is high enough to correctly represent the air pressure information. Where the time period required for the transmitter to transmit the air pressure information is relatively long, the probability of incorrect reception of the information is lower due to an influence of the noise on a part of the information than where the time period is relatively short. Accordingly, the probability of correct reception of the entire information by the receiver ("reception ratio") is lowered with an increase in the time period of the transmission. In the tire air pressure information supply device disclosed in the above-identified publication, the time period of the transmission where the tire air pressure is normal is the same as that where the tire air pressure is abnormal. The reception ratio is lower when the rotating speed of the vehicle wheel is relatively high than when the rotating speed is relatively low, provided the time period of the transmission and the noise level are constant. This is because the ratio of the time period required to transmit a series of the air pressure information to the time period required for one revolution of the wheel increases with an increase in the rotating speed of the wheel.

SUMMARY OF THE INVENTION

It is therefore an object of this invention to provide a vehicle wheel information supply device capable of increasing, as needed, a ratio of reception by a receiver disposed on the vehicle body, of vehicle wheel information transmitted from a transmitter disposed on a wheel of the vehicle.

Another object of the invention is to provide a vehicle wheel tire abnormality indicating device which includes such a vehicle wheel information supply device.

One of the above objects may be achieved according to any one of the following modes of the invention, each of which is numbered like the appended claims and depends from the other mode or modes, where appropriate, to indicate possible combinations of elements or technical features. However, it is to be understood that the invention is not limited to the modes described below and that any one of technical features recited in any one of the modes may be a subject matter of this invention.

(1) A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of the wheel state detector, a transmitter for transmitting the wheel information, and a receiver which receives the wheel information transmitted by the transmitter, the wheel state detector, the wheel information generator and the transmitter being disposed on the wheel while the receiver being disposed on a body of the vehicle, wherein the wheel information generator is capable of selectively generating different kinds of wheel information having respective different volumes, and at least one of the wheel information generator and the transmitter operates in a manner which changes depending upon at least one parameter indicative of the state of the wheel, which at least one parameter is detected by the wheel state detector.

In the vehicle wheel information supply device, the wheel information relating to the state of the vehicle wheel is generated by the wheel information generator on the basis of the output of the wheel state detector, and is transmitted by the transmitter to the receiver disposed on the vehicle body. The wheel information generator is capable of selectively generating different kinds of wheel information having respective different volumes. At least one of the wheel information generator and the transmitter operates in a manner depending upon at least one parameter indicative of the wheel state detected by the wheel state detector. Namely, at least one of the information generating mode of the wheel information generator and the information transmitting mode of the transmitter is changed depending upon the at least one parameter detected by the wheel state detector, such as the tire air pressure and temperature and the rotating speed of the wheel.

For instance, the wheel information generator generates the wheel information such that the volume of the generated wheel information changes depending upon the detected at least one parameter indicative of the wheel state, such as the tire air pressure or the rotating speed of the wheel. For example, the volume of the generated wheel information is made smaller when the detected tire air pressure is lower than a predetermined threshold, than when the tire air pressure is not lower than the threshold. Alternatively, the volume of the generated wheel information is made smaller when the detected wheel speed is higher than a predetermined threshold, than when the wheel speed is not higher than the threshold. The volume of the wheel information generated by the wheel information generator may decrease with a decrease in the tire air pressure or an increase in the rotating speed of the wheel.

When the volume of the wheel information generated by the wheel information generator is relatively small, the time required for the transmitter to transmit the generated wheel information is shorter, resulting in a higher ratio of reception of the transmitted wheel information by the receiver, than when the volume of the generated wheel information is relatively large. The shorter time required for transmitting the wheel information means an accordingly shorter time before the receiver disposed on the vehicle body has received the transmitted wheel information. The increased ratio of reception of the transmitted wheel information by the receiver means a reduced number of times of transmission of the wheel information required before the receiver correctly receives the wheel information. In this respect, too, the time before the receiver has received the wheel information is reduced.

The manner of operation of the transmitter to transmit the generated wheel information may change depending upon the detected state of the wheel. For instance, the number of times of transmission of the wheel information by the transmitter, and/or the frequency of transmission per unit of the wheel information by the transmitter may be changed depending upon the detected state of the wheel. Where the different kinds of wheel information having the respective different volumes generated by the wheel information generator are transmitted by the transmitter, the proportion of the numbers of times of transmission of those different kinds of wheel information may be changed depending upon the detected wheel state. Further, at least one of the different kinds of wheel information may be selected depending upon the detected wheel state.

For instance, the transmitter transmits the generated wheel information such that the number of times or frequency of transmission of the wheel information is larger or higher when the detected air pressure of the wheel tire is lower than a predetermined threshold, than when the detected tire air pressure is not lower than the threshold. Alternatively, the number of times or frequency of transmission of the wheel information increases with a decrease in the tire air pressure, for example. Further, two kinds of wheel information having different volumes may be alternately transmitted when the detected tire air pressure is lower than a predetermined threshold, and only the wheel information having the larger volume is transmitted when the detected tire air pressure is not lower than the threshold. Of course, the manner of transmission of the wheel information by the transmitter may change with a change in the detected rotating speed of the wheel.

When the wheel information is transmitted two or more times or at a relatively high frequency, the reception ratio of the transmitted information can be made higher than when the wheel information is transmitted only once or at a relatively low frequency. If two or more kinds of wheel information having different volumes are transmitted successively upon each operation of the transmitter, the reception ratio of at least one of these plurality of wheel information can be made higher than when only one kind of wheel information is transmitted.

A wheel speed detector for detecting the rotating speed of the wheel may be disposed on either the vehicle body or the wheel itself. Where data communication between the transmitter and the receiver is affected directionally, the wheel speed detector can be disposed on the vehicle body. Where the data communication is possible in only one direction from the transmitter to the receiver, the wheel speed detector must be disposed on the wheel. Where the wheel speed detector is disposed on the vehicle body, the detector may be an electromagnetic pick-up type including a detecting portion which is adapted to detect the rotating speed of a rotor which rotates with the wheel. Where the wheel speed detector is disposed on the wheel itself, the detector may include a centrifugal force detecting portion adapted to detect the centrifugal force generated during rotation of the wheel. The centrifugal detecting portion may be disposed on the tire of the wheel, or a portion of the wheel at which the tire is held, such that the detecting portion detects a radial force acting on a weight. This centrifugal detecting portion may be a strain gage, a piezoelectric element or any other element capable of generating an electric signal which represents the centrifugal force, which in turn represents the rotating speed of the wheel.

The wheel information relating to the state of the wheel includes: wheel state information indicative of the state of the wheel; wheel state change information indicative of a rate of change of the wheel state with the time; and wheel state assessment information indicative of an assessment of the wheel state. The assessment of the wheel state may be an indication as to whether a parameter indicative of the wheel state exceeds a predetermined threshold, or whether a rate of change of the parameter exceeds a predetermined threshold. Described in detail, the wheel state detector may include an air pressure detector adapted to detect the air pressure of the tire of the wheel, a tire temperature detector adapted to detect the temperature of the wheel tire, a tire deformation detector adapted to detect the shape or deformation of the wheel tire, and a wheel speed detector adapted to detect the rotating speed of the wheel. The wheel information relating to the air pressure of the wheel tire may include: air pressure information indicative of the tire air pressure; air pressure reduction rate information indicative of a rate of reduction of the tire air pressure; air pressure assessment information indicative of whether the tire air pressure is normal; and abrupt air pressure reduction information indicating that the tire air pressure is lowered at a rate higher than a predetermined threshold. The wheel information relating to the temperature of the wheel tire may include: tire temperature information indicative of the temperature of the tire; tire temperature rise rate information indicative of a rate of rise of the tire temperature; excessive tire temperature rise information indicating that the tire temperature is higher than a predetermined upper limit; and an abrupt tire temperature rise information indicating that the tire temperature is rising at a rate higher than a predetermined threshold. The wheel information relating to the shape or deformation of the tire may include: tire deformation information indicative of a deformation of the tire; excessive tire deformation information indicative of an excessive amount of deformation of the tire; and other sorts of information as described above with respect to the tire air pressure and temperature. The wheel information relating the rotating speed of the wheel may include wheel speed information indicative of the rotating speed of the wheel.

(2) A vehicle wheel information supply device according to the above mode (1), wherein the wheel information generator operates in a manner which changes depending upon the at least one parameter indicative of the state of the wheel.

In the vehicle wheel information supply device according to the above mode (2), the wheel information generator generates the wheel information in the manner which depends upon the above-indicated at least one parameter of the wheel state detected by the wheel state detector, and the thus generated wheel information is transmitted by the transmitter according to a predetermined rule. The transmitter may be adapted to transmit the wheel information each time the wheel information is generated by the wheel information generator, or transmit the generated wheel information a plurality of times successively. Where the generator is adapted to generate different kinds of wheel information at one time, the transmitter may transmit these kinds of wheel information successively, or transmit each of these kinds of wheel information a predetermined number of times.

(3) A vehicle wheel information supply device according to the above mode (1) or (2), wherein the wheel information generator comprises a first wheel information generating portion for generating first wheel information having a first volume, and a second wheel information generating portion for generating second wheel information having a second volume smaller than the first volume, the first and second wheel information generating portions being activated to generate the first wheel information and the second wheel information as the different kinds of wheel information, depending upon the above-indicated at least one parameter indicative of the state of the wheel detected by said wheel state detector.

In the vehicle wheel information supply device according to the above mode (3), the first or second wheel information is generated by the first or second wheel information generating device, depending upon the at least one parameter of the wheel state detected by the wheel state detector. The volume of the second wheel information generated by the second wheel information generating portion is smaller than that of the first wheel information generated by the first wheel information generating portion, so that the time required for the transmitter to transmit the second wheel information is shorter than the time required for the transmitter to transmit the first wheel information, whereby the second wheel information has a higher ratio of reception by the receiver.

The wheel information generator may further comprise at least one additional wheel information generating portion, for example, third and fourth wheel information generating portions, in addition to the first and second wheel information generating portions indicated above.

(4) A vehicle wheel information supply device according to the above mode (3), wherein the second wheel information generating portion is activated when a value of each of the above-indicated at least one parameter becomes larger or smaller than a predetermined threshold, the at least one parameter being selected from a plurality of parameters including a rotating speed of the wheel.

The threshold value of the wheel state parameter may be an upper or lower limit above or below which the state of the wheel is considered to be abnormal and the operator of the vehicle must be informed of this abnormality. Alternatively, the threshold value may be an upper or lower limit above or below which there is a high probability that the wheel state will be abnormal in a short time. The plurality of parameters from which the above-indicated at least one parameter is selected may include a wheel state quantity directly indicative of the state of the wheel, a rate of change of the wheel state quantity, and a quantity which changes with the wheel state quantity. The second wheel information generated by the second wheel information generating portion when the parameter value becomes higher or lower than the threshold value has a higher ratio of reception by the receiver, since the volume of the second wheel information is relatively small.

Where the second wheel information generating portion is activated when the state of the wheel is determined to be abnormal, the second wheel information generating portion is considered as an abnormal wheel information generating portion adapted to generate abnormal wheel information indicative of an abnormal state of the wheel. Since the second wheel information is required to be received by the receiver with a comparatively high reception ratio, the second wheel information generating portion may be considered as a wheel information generating portion which is activated when the wheel information is required to be received with a high reception ratio. Since the abnormal wheel information generated when the wheel state is abnormal is more important and is required to be more urgently received by the receiver than normal wheel information indicative of the normal state of the wheel, the second wheel information generating portion may be considered to be a wheel information generating portion adapted to generate important or emergency wheel information.

As indicated above, the ratio of reception of the wheel information by the receiver is relatively low when the rotating speed of the wheel is relatively high. Where the second wheel information generating portion is activated to generate the second wheel information having the relatively small volume when the rotating speed of the wheel becomes higher than a predetermined threshold, the reception ratio of the wheel information (second wheel information) can be maintained relatively high. In this respect, the second wheel information may be considered to be high-speed wheel information generated when the wheel speed is relatively high.

(5) A vehicle wheel information supply device according to the above mode (3) or (4), wherein the above-indicated at least one parameter includes a rotating speed of the wheel, and the second wheel information generating portion is activated when the rotating speed of the wheel becomes higher than a predetermined threshold.

(6) A vehicle wheel information supply device according to any one of the above modes (3)–(5), wherein the wheel information generator further comprises commanding means for activating the second wheel information generating portion when a value of each of the above-indicated at least one parameter becomes larger or smaller than a predetermined threshold, and the at least one parameter is selected from a plurality of parameters including a rotating speed of the wheel.

In the vehicle wheel information supply device according to the above mode (6) wherein the second wheel information generating portion is activated by the commanding means when the value of each of the above-indicated at least one parameter of the wheel state becomes larger or smaller than the threshold (when the wheel state is not normal), the commanding means may be adapted to activate the first wheel information generating portion in the other or normal state of the wheel. In this case, the first and second wheel information generating portions are selectively activated depending upon the value of the parameterts) as compared with the threshold. In this respect, the commanding means may be considered to be selecting means for selectively activating the first and second wheel information generating portions. The commanding means may be adapted to activate only the first wheel information generating portion when the wheel state is normal, and activate both of the first and second wheel information generating portions when the wheel state is not normal.

(7) A vehicle wheel information supply device according to any one of the above modes (3)–(6), wherein the first and second wheel information generating portions are both activated to generate the first wheel information and the second wheel information when a value of each of the above-indicated at least one parameter becomes larger or smaller than a predetermined threshold, the at least one parameter being selected from a plurality of parameters including a rotating speed of the wheel, the transmitter transmitting the first and second wheel information successively to the receiver.

The ratio of reception of at least one of the first and second wheel information by the receiver when the first and second wheel information are successively transmitted by the transmitter is higher than the ratio of reception of only one of the first and second wheel information by the receiver. The first wheel information may include a part of the second wheel information or information that can be used by the receiver to generate the second wheel information. Where this first wheel information and the second wheel information are successively transmitted at a predetermined time interval or with a predetermined cycle time, the second wheel information or the information that can be used to generate the second wheel information can be correctly received by the receiver at an earlier point of time with higher probability, than in the case where only one of the first and second wheel information is repeatedly transmitted at the same time interval.

(8) A vehicle wheel information supply device according to any one of the above modes (3)–(7), wherein the second wheel information generating portion is activated when the above-indicated at least one parameter detected by the wheel state detector indicates an abnormal state of the wheel, the second wheel information including abnormality data indicative of the abnormal state of the wheel and not including any wheel state quantity data indicative of the state of the wheel.

In the vehicle wheel information supply device according to the above mode (8), the second wheel information generated by the second wheel information generating portion includes the abnormality data but does not include any wheel state quantity data, so that the volume of the wheel information transmitted when the wheel state is abnormal is reduced to a required minimum for increasing the reception ratio of the wheel information (second wheel information).

(9) A vehicle wheel information supply device according to any one of the above modes (1)–(8), wherein the different kinds of wheel information include at least one kind of information each of which includes primary information indicative of the state of the wheel, and ancillary information, the primary information and the ancillary information being transmitted by the transmitter as a unit of information.

(10) A vehicle wheel information supply device according to the above mode (9), wherein the ancillary information include header/trailer information indicative of at least one of opposite ends of the unit of information.

The primary information and the ancillary information cooperate to constitute a unit of information which is transmitted to the receiver at one time. The volume of the second wheel information can be reduced by reducing at least one of the volumes of the primary information and the ancillary information of the second wheel information, as compared with the volumes of the primary and ancillary information of the first wheel information.

Where the volume of the primary information of the second wheel information is reduced, the number of items represented by the primary information is reduced, but the total volume of the second wheel information is reduced. For instance, the primary information of the first wheel information may include air pressure data representative of an air pressure in a tire of the wheel, and a tire temperature data representative of a temperature of the tire. In this case, the second wheel information may be formulated such that the primary information includes only the air pressure data and does not include the tire temperature data. The second wheel information may include only abnormality data indicating that the wheel state is abnormal.

The ancillary information may include header/trailer data indicative of at least one of the opposite ends of the unit of information. The header/trailer data may include at least one of header data indicative of the leading end of the unit of information, and trailer data indicative of the trailing end of the unit of information. The ancillary data may include identification data which identify the transmitter from which the wheel information including the identification data is transmitted to the receiver. The volume of the identification data generally increases with an increase in the accuracy with which the transmitter can be identified by the identification data. Although the accuracy of identification of the identification data need not be so high, the identification data are considered essential to prevent the receiver from receiving wheel information from a transmitter provided on another vehicle which exists near the receiver on the vehicle in question. The ancillary information may further include transmission state data indicating a state of transmission of the wheel information from the transmitter disposed on the vehicle wheel. For example, the transmission state information includes data indicating whether the transmitter is normal or abnormal, and data indicative of a voltage of a battery provided in the transmitter, or data indicative of a surplus voltage which is a difference between the actual voltage of the battery and a voltage required to normally operate the transmitter. The identification data and the transmission state data, which are not so important or essential, may not be included in the wheel information, or the volumes of the identification data and the transmission state data may be reduced, so that the volume of the ancillary data is reduced. Similarly, the header data and the trailer data may not be included in the wheel information, or the volumes of the header and trailer data may be reduced.

Data included in at least one of the different kinds of wheel information may serve as both the primary data and the ancillary data. For instance, data indicating whether the wheel state is normal or abnormal may serve as the trailer data indicative of the trailing end of the unit of information (wheel information). Namely, where normal wheel information generated when the wheel state is normal and abnormal wheel information generated when the wheel state is abnormal have different volumes which are registered in the receiver, the trailer data which constitute at least a part of the ancillary information and which indicate the total volume of the wheel information may be considered as data which indicate whether the wheel state is normal or abnormal and which constitute at least a part of the primary information. In this case, the same data included in the wheel information (normal wheel information or abnormal wheel information) serve as both the ancillary data and the primary data.

(11) A vehicle wheel information supply device according to any one of the above modes (1)–(10), wherein at least one of the wheel information generator and the transmitter operates in one of a plurality of different modes which is selected depending upon a rotating speed of the wheel which is detected by the wheel state detector.

In the device according to the above mode (11), at least one of the wheel information generator and the transmitter operates in one of the two or more different modes which is selected depending upon the detected speed of the wheel. For instance, the generator operates in a selected mode of a plurality of wheel information generating modes or patterns in which different kinds of wheel information having respective different volumes are generated, respectively. Alternatively, the transmitter operates in a selected one of wheel information transmitting modes or patterns in which wheel information generated by the generator is transmitted in respective different manners. Further alternatively, the generator and the transmitter operate in a selected one of a plurality of combinations of a wheel information generating mode and a wheel information transmitting mode.

The different kinds of wheel information generated in the respective wheel information generating modes may have respective different volumes corresponding to respective ranges of the wheel speed. Alternatively, the generator may be adapted to generate two kinds of wheel information having respective different volumes when the wheel speed is higher than a predetermined upper limit, and only one of the two kinds of wheel information which has the larger volume when the wheel speed is not higher than the upper limit. Where the wheel information generator comprises a first wheel information generating portion for generating first wheel information having a relatively large volume and a second wheel information generating portion for generating second wheel information having a relatively small volume, these first and second wheel information generating portions are selected and activated in respective two different wheel information generating modes of the generator depending upon whether the wheel speed is higher than the upper limit or not.

The different wheel information transmitting modes may consist of a mode in which wheel information generated by the generator is transmitted a first number of times (N+α) when the detected wheel speed is higher than a predetermined upper limit, and a mode in which the generated wheel information is transmitted a second number of times (N) which is smaller than the first number of times (N+α). Where the wheel information generator generates first and second wheel information having relatively large and small volumes, respectively, the different wheel information transmitting modes may consist of a mode in which the first and second wheel information are both transmitted when the detected wheel speed is higher than a predetermined upper limit, and a mode in which only the first wheel information is transmitted when the wheel speed is not higher than the upper limit. The transmitter may include a plurality of wheel information transmitting portions which are adapted to transmit the generated wheel information respective different numbers of times or at respective different frequencies, or respective different kinds of wheel information having respective different volumes. These plurality of wheel information transmitting portions are selectively activated in respective different modes of operation of the transmitter, depending upon the detected speed of the wheel. Other operation modes of the transmitter will be described in the DETAILED DESCRIPTION OF THE
PREFERRED EMBODIMENTS given below.

The plurality of combinations of the wheel information generating mode and the wheel information transmitting mode may consist of a combination in which first wheel information having a relatively small volume is generated by the generator and is transmitted by the transmitter a first number of times (N+α) when the detected wheel speed is higher than a predetermined upper limit, and a combination in which second wheel information having a relatively large volume is generated and is transmitted a second number of times (N) smaller than the first number of times when the wheel speed is not higher than the upper limit.

The above indicated different wheel information generating modes, wheel information transmitting modes and combinations of wheel information generating and transmitting modes may be selectively established depending upon any parameter other than the wheel speed, such as tire air pressure of the wheel.

(12) A vehicle wheel information supply device according to any one of the above modes (1)–(11), wherein the wheel information generator comprises normal-frequency wheel information generating portion for generating the wheel information at a predetermined first frequency, and a high-frequency wheel information generating portion for generating the wheel information at a predetermined second frequency higher than the first frequency, the first and second wheel information generating portions being activated to generate the first wheel information and the second wheel information as the different kinds of wheel information, depending upon the above-indicated at least one parameter indicative of the state of the wheel detected by the wheel state detector.

For example, the wheel information is generated by the normal-frequency wheel information generating portion at the first frequency when a value of each of the above-indicated at least one parameter detected by the wheel state detector is not larger or smaller than a predetermined threshold, and by the high-frequency wheel information generating portion at the second frequency when the value is larger or smaller than the threshold. In this case, the wheel information generated by the high-frequency wheel information generating portion is transmitted at a relatively high frequency, so that the ratio of reception of this wheel information by the receiver is increased.

Where the at least one parameter consists of a rotating speed of the wheel, the wheel information is generated by the high-frequency wheel information generating portion when the speed of the wheel is higher than a predetermined upper limit, so as to prevent reduction of the ratio of reception of the wheel information by the receiver when the wheel speed is relatively high.

It will be understood that the feature according to the above mode (12) is available independently of the feature according to any one of the above modes (1)–(11).

(13) A vehicle wheel information supply device according to any one of the above modes (1)–(12), wherein the transmitter operates in a manner which changes depending upon the at least one parameter indicative of the state of the wheel detected by the wheel state detector.

In the device according to the above mode (13), the wheel information generated by the wheel information generator according to a predetermined rule is transmitted by the transmitter operated in the manner determined by the above-indicated at least one parameter of the wheel state detected by the wheel state detector. For instance, the transmitter may be operated in one of the following modes: a mode in which the number of times of transmission of the generated wheel information changes depending upon the detected at least one parameter; a mode in which the frequency at which the generated wheel information is transmitted changes depending upon the detected at least one parameter; a mode in which the proportion of generated different kinds of wheel information having respective different volumes to be transmitted changes depending upon the detected at least one parameter; and a mode in which one of the generated different kinds of wheel information which is to be transmitted is selected depending upon the detected at least one parameter.

(14) A vehicle wheel information supply device according to any one of the above modes (1)–(13), wherein the transmitter comprises transmission controlling means for controlling the number of times of transmission of the wheel information such that the number of times of transmission is larger when a value of each of the above-indicated at least one parameter indicative of the state of the wheel detected by the wheel state detector is larger or smaller than a predetermined threshold, than when the value is not larger or smaller than the predetermined threshold, the above-indicated at least one parameter being selected from a plurality of parameters including a rotating speed of the wheel.

Where the wheel transmission is transmitted by the transmitter each time the wheel transmission is generated by the wheel information generator, the number of times of generation of the wheel information is the same as the number of times of transmission of the wheel information. That is, the number of times of transmission of the wheel information increases with an increase in the number of times of generation of the wheel information. However, the same wheel information generated by the generator may be transmitted a plurality of times. In this case, the number of times of transmission of the wheel information can be increased without increasing the number of times of generation of the wheel information. Where the second wheel information including abnormality data and not including any wheel state quantity data as described above with respect to the above mode (8) is generated by the generator, this second wheel information is transmitted a plurality of times after the second wheel information is generated once. If the number of times of transmission of the wheel information per unit time is increased, the frequency of transmission of the wheel information is increased. In this case, high-frequency wheel information transmitting means for transmitting the wheel information at a relatively high frequency serves as the transmission controlling means.

It is noted that the amount of consumption of the electric energy stored in a battery provided in the transmitter increases with an increase in the cumulative time of transmission of the wheel information, and the voltage of the battery decreases with the cumulative time of transmission. Suppose the cumulative time of transmission where the wheel information having a relatively small volume is transmitted a plurality of times is the same as the time of transmission of the wheel information having a relatively large volume, the transmission of the small-volume wheel information a plurality of times is advantageous over the transmission of the large-volume wheel information a single time, since the former transmission permits a higher ratio of correct reception of the transmitted wheel information by the receiver.

It will be understood that the feature according to the above mode (14) is available independently of the feature according to any one of the above modes (1)–(13).

(15) A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of the wheel state detector, a transmitter for transmitting the wheel information, and a receiver which receives the wheel information transmitted by the transmitter, the wheel state detector, the wheel information generator and the transmitter being disposed on the wheel while the receiver being disposed on a body of the vehicle, wherein the wheel information generator is capable of generating different kinds of wheel information having respective different volumes, and includes a wheel information supply control device for controlling at least one of an operation of the wheel information generator and an operation of the transmitter, for thereby controlling a condition in which the wheel information is supplied, depending upon at least one parameter indicative of the state of the wheel, which at least one parameter is detected by the wheel state detector.

The condition in which the wheel information is supplied can be controlled by the wheel information supply control device, which is adapted to control at least one of the operation of the wheel information generator and the operation of the transmitter. The wheel information supply control device may include a memory portion which stores control programs for controlling the wheel information generator in a selected one of different wheel information generating modes as described above with respect to the mode (11), and a control portion for activating a selected one of wheel information generating portions which corresponds to the selected wheel information generating mode. For instance, the wheel information supply control device is adapted to selectively activate the first and second wheel information generating portions as described above with respect to the mode (3). Alternatively, the wheel information supply control device may include a memory portion which stores control programs for controlling the transmitter in a selected one of different wheel information transmitting modes, and a control portion for controlling the transmitter in the selected wheel information transmitting mode. The wheel information supply control device may be constituted by a portion of the wheel information generator or the transmitter, or may be a unit separate from the generator or the transmitter.

It will be understood that the technical feature according to any one of the above modes (1)–(14) may be incorporated in the vehicle wheel information supply device according to the above mode (15).

(16) A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of the wheel state detector, a transmitter for transmitting the wheel information, and a receiver which receives the wheel information transmitted by the transmitter, the wheel state detector, the wheel information generator and the transmitter being disposed on the wheel while the receiver being disposed on a body of the vehicle, wherein the wheel information generator includes an information volume changing device for changing a volume of the wheel information depending upon at least one parameter indicative of the state of the wheel, which at least one parameter is detected by the wheel state detector.

The ratio of reception of the wheel information by the receiver can be increased by reducing the volume of the wheel information. Since the need for correct reception of the wheel information increases as the degree of abnormality of the wheel as indicated by the wheel information increases, the volume of the wheel information is desirably reduced with an increase in the degree of abnormality of the wheel as indicated by the wheel information. Although the ratio of reception of the wheel information decreases with an increase in the rotating speed of the wheel, this decrease of the reception ratio can be reduced by reducing the volume of the wheel information with an increase in the wheel speed.

The technical feature according to any one of the above modes (1)–(15) may be incorporated in the vehicle wheel information supply device according to the above mode (16).

(17) A vehicle wheel information supply device according to any one of the above modes (3)–(16), wherein the wheel state detector includes an air pressure detector for detecting an air pressure in a tire of the wheel, and the wheel information includes air pressure data relating to the air pressure detected by the air pressure detector.

In the vehicle wheel information supply device according to the above mode (17), the wheel information generator generates the wheel information which includes the air pressure data relating to the air pressure of the tire of the wheel detected by the air pressure detector. The air pressure data may include a value of the air pressure of the tire, data indicating that the air pressure is being lowered, data indicative of a result of analysis of the air pressure, and data indicative of an abrupt reduction of the air pressure.

(18) A vehicle wheel information supply device according to the above mode (17), wherein the second wheel information generating portion is activated to generate the second wheel information when a rate of reduction of the air pressure detected by the air pressure detector is higher than a predetermined threshold.

The second wheel information which is generated when the rate of reduction of the air pressure is higher than the predetermined threshold has a smaller volume than the first wheel information which is generated when the rate of reduction is not higher than the threshold. Namely, the second wheel information generated when the tire air pressure is abruptly reduced has the smaller volume and therefore has a higher ratio of reception by the receiver, than the first wheel information generated when the tire air pressure is relatively slowly reduced. The second information generated when the tire air pressure is abruptly reduced may be considered as warning information indicating a possibility that the tire air pressure will be lowered in the near future to a level at which the vehicle cannot run. This warning information having the relatively small volume can be correctly received by the receiver at a relatively high ratio.

(19) A vehicle wheel information supply device according to the above mode (17), wherein the second wheel information generating portion is activated to generate the second wheel information when the air pressure detected by the air pressure detector is lower than a preset value.

According to the above mode (19), the ratio of reception of the wheel information by the receiver can be made higher when the detected tire air pressure is lower than the preset value, than that when the detected tire air pressure not lower than the present value.

(20) A vehicle wheel information supply device according to any one of the above modes (17)–(19), wherein the second wheel information generating portion is activated to generate the second wheel information when a state of reduction of the air pressure detected by the air pressure detector is abnormal and an operator of the vehicle must be informed of this abnormal state of reduction of the air pressure, the second wheel information including tire pressure abnormality data indicative of the abnormal state of reduction of the air pressure and not including any data indicative of the air pressure detected by the air pressure detector.

In the vehicle wheel information supply device according to the above mode (20), the wheel information generated when the rate of reduction of the detected tire air pressure is abnormal and the vehicle operator must be informed of this fact does not include any data directly indicating the detected tire air pressure, but includes data indicative of the abnormal state of reduction of the tire air pressure. Accordingly, the volume of the wheel information to be transmitted to the receiver can be minimized.

(21) A vehicle wheel information supply device according to the above mode (17), wherein the first wheel information generating portion and the second wheel information generating portion are activated to generate the first wheel information and the second wheel information, respectively, when a state of reduction of the air pressure detected by the air pressure detector is abnormal and an operator of the vehicle must be informed of this abnormal state of reduction of the air pressure, the first wheel information including both data indicative of the air pressure detected by the air pressure detector and data indicative of the abnormal state of reduction of the air pressure, the second wheel information including the data indicative of the abnormal state of reduction of the air pressure and not including data indicative of the air pressure, the transmitter transmitting to the receiver the first wheel information and the second wheel information successively.

(22) A vehicle wheel information supply device according to any one of the above modes (17)–(21), wherein the wheel state detector further includes a tire temperature detector for detecting a temperature of a tire of the wheel, and the first wheel information is a unit of information consisting of (a) primary information including the air pressure data and tire temperature data indicative of the temperature of the tire, and (b) ancillary information, while the second wheel information is a unit of information consisting of (c) primary information including the air pressure data and not including the tire temperature data and (d) ancillary information.

The second wheel information which does not include the tire temperature data has a smaller volume than the first wheel information which includes the tire temperature data. The ancillary information include data as described above with respect to the above mode (10).

(23) A vehicle wheel information supply device according to any one of the above modes (17)–(22), wherein the wheel information generator includes high-frequency wheel information generating portion for generating the wheel information at a higher frequency when a value of each of at least one parameter relating to the air pressure of the tire of the wheel detected by the air pressure detector is larger or smaller than a predetermined threshold, than when the value is not larger or smaller than the predetermined threshold.

The above-indicated at least one parameter relating to the air pressure of the wheel tire may include a value of the tire air pressure per se, a rate of reduction of the tire air pressure, a quantity which changes in proportion to the tire air pressure, and a rate of change of this quantity, for example.

In the above mode (23), the high-frequency wheel information generating portion is activated to generate the wheel information at the relatively high frequency, for instance when the detected tire air pressure is reduced below a preset value or when the rate of reduction of the detected air pressure is higher than a predetermined upper limit.

(24) A vehicle wheel information supply device according to any one of the above modes (17)–(23), wherein the transmitter operates in a manner which changes depending upon at least one of the air pressure of the tire of the wheel and a rotating speed of the wheel.

(25) A vehicle wheel information supply device according to any one of the above modes (17)–(24), wherein the transmitter comprises transmission controlling means for controlling the number of times of transmission of the wheel information such that the number of times of transmission is larger when a value of each of at least one parameter relating to the air pressure of the tire of the wheel is larger or smaller than a predetermined threshold, than when the value of each of the at least one parameter relating to the air pressure is not larger or smaller than the predetermined threshold.

(26) A vehicle wheel information supply device for supplying wheel information relating to a state of a wheel of a vehicle, including an air pressure detector for an air pressure in a tire of the wheel, an air pressure information generator for generating air pressure information relating to the air pressure of the wheel, on the basis of an output of the air pressure detector, a transmitter for transmitting the air pressure information, and a receiver which receives the air pressure information transmitted by the transmitter, the air pressure detector, the air pressure information generator and the transmitter being disposed on the wheel while the receiver being disposed on a body of the vehicle, wherein the air pressure information generator includes an information volume changing device for changing a volume of the air pressure information depending upon at least one parameter relating to the air pressure of the wheel, which at least one parameter is detected by the air pressure detector.

For instance, the information volume changing device is adapted to reduce the volume of the air pressure information as the detected air pressure is reduced, or as the the rate of reduction of the detected air pressure increases.

(27) A vehicle wheel information supply device according to any one of the above modes (1)–(26), wherein the receiver includes a controller for changing a mode of operation of the receiver from a reception standby mode to a registration mode when the receiver receives a registration mode signal received from the transmitter, the receiver normally processing the wheel information received from the transmitter when the receiver is placed in the reception standby mode, and registering identification data received from the transmitter when the receiver is placed in the registration mode, the wheel information including the identification data which identify the transmitter.

Normally, the receiver is placed in the reception standby mode in which the wheel information received from the transmitter is normally processed, so that the state of the wheel can be recognized. When the receiver receives the registration mode signal, the controller of the receiver changes the operation mode from the reception standby mode to the registration mode in which the identification data received from the transmitter can be registered in a appropriate memory of the controller. The wheel information received from the transmitter in the reception standby mode include the identification data. The controller compares the identification data included in the received wheel information, with the identification data already registered in the memory, so that the transmitter from which the wheel information for the particular wheel has been received can be identified by the comparison. Thus, the registration mode is established by the controller when the receiver receives the registration mode signal from the transmitter. The present arrangement eliminates an operator-controlled switch conventionally used to change the operation mode of the receiver from the reception standby mode to the registration mode.

It will be understood that the feature according to the above mode (27) is available independently of the feature according to any one of the above modes (1)–(26).

(28) A vehicle wheel information supply device according to the above mode (27), wherein the transmitter transmits the registration mode signal to the receiver while the receiver is incapable of receiving information from a transmitter provided on another vehicle and when the vehicle wheel information supply device is placed in a predetermined state.

There is a risk that the receiver of the present wheel information supply device provided on the vehicle in question receives information such as identification data from a transmitter provided on another vehicle. To avoid the reception of information from the transmitter on another vehicle, the transmitter of the present wheel information supply device provided on the vehicle in question is desirably adapted to transmit the registration mode signal and the identification data while the receiver of the present wheel information supply device is not able to receive information from the transmitter on another vehicle.

Further, the transmitter of the present vehicle wheel information supply device must be placed in the predetermined state in which the registration mode signal and the identification data can be correctly received by the receiver of the present vehicle wheel information supply device. The predetermined state may be a state in which the air pressure of the tire is detectable by the wheel state detector after the wheel is attached to the vehicle body and the tire is inflated with air. For instance, the wheel information generator may be adapted to generate air pressure information as the wheel information when the tire air pressure becomes higher than a lowest level detectable by an air pressure detector. In this instance, the transmitter transmits the registration mode signal when the tire air pressure is raised above the detectable lowest level. After the receiver is placed in the registration mode upon reception of the registration mode signal, the transmitter transmits the identification data so that the receiver registers the received identification data which identify the transmitter. The detectable lowest level of the tire air pressure is lower than a lower limit below which the vehicle cannot run. The transmitter may be adapted to transmit the registration mode signal when the tire air pressure detected by the air pressure detector is raised above a predetermined level which is higher than the detectable lowest level and which is desirably lower than the above-indicated lower limit.

Thus, the registration mode signal is transmitted by the transmitter when the air pressure detector detects the detectable lowest level or the predetermined level while the tire air pressure is raised. In this respect, it is noted that the air pressure detector functions as a switch for triggering the transmitter to transmit the registration mode signal. Accordingly, the registration mode signal is transmitted when the tire of the wheel to the vehicle body is inflated with air, with the tire air pressure being raised from a level below the detectable lowest level or the predetermined level. If the tire air pressure is higher than the detectable lowest or predetermined level before the registration mode of the receiver is established, the tire air pressure must be first lowered below the detectable lowest or predetermined level and then raised above this level, so that the registration mode signal is transmitted to the receiver to establish the registration mode.

(29) A vehicle wheel information supply device according to the above mode (28), wherein the transmitter transmits the identification data following the registration mode signal, so that the identification data are registered in the receiver immediately after the registration mode is established by the controller according to the registration mode signal.

Although the identification data may be transmitted to the receiver at any time after the receiver has been placed in the registration mode, the identification data are preferably transmitted immediately following the registration mode signal, so as to prevent registration of data other than the identification data, and to assure correct registration of the identification data. The identification data to be registered may consist of a single item of data or a plurality of items of data.

For instance, the identification data include detailed identification data having a relatively large volume and abridged identification data having a relatively small volume. These detailed identification data and abridged identification data are registered in the receiver in the registration mode. In the reception standby mode, the detailed and abridged identification data included in the wheel information transmitted from the transmitter are compared with the registered detailed and abridged identification data, to determine the transmitter from which the wheel information has been received, namely, to determine the wheel whose wheel information has been received. Where the wheel information includes the abridged identification data, the total volume of the wheel information can be reduced. Where two or more items of identification data have been registered in the receiver, the wheel information need not include all of those items of identification data, and may include only a part of the registered identification data. The volume of the wheel information can be reduced by reducing the volume of the identification data.

(30) A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of the wheel state detector, a transmitter for transmitting the wheel information, and a receiver which receives the wheel information transmitted by the transmitter, the wheel state detector, the wheel information generator and the transmitter being disposed on the wheel while the receiver being disposed on a body of the vehicle, wherein the wheel information generator comprises a first wheel information generating portion for generating first wheel information having a first volume, and a second wheel information generating portion for generating second wheel information having a second volume smaller than the first volume, at least one of the first and second wheel information generating portions being activated to generate at least one of the first wheel information and the second wheel information, depending upon at least one parameter indicative of the state of the wheel, which at least one parameter is detected by the wheel state detector.

(31) A vehicle wheel state indicating device comprising: a vehicle wheel information supply device according to any one of the above modes (1)–(16); and an information output device informing an operator of the vehicle, of the state of the wheel, on the basis of the wheel information received by the receiver of the vehicle wheel information supply device.

(32) A vehicle wheel tire abnormality indicating device comprising:
a vehicle wheel information supply device according to any one of the above modes (17)–(26); and
an indicating device informing an operator of the vehicle that the air pressure in the tire is abnormal, when the receiver receives the second wheel information which include tire pressure abnormality data indicating that a state of reduction of the air pressure detected by the air pressure detector is abnormal.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 11 is a view illustrating a further series of wheel information generated by the wheel information generator;

FIG. 12 is a block diagram showing a vehicle wheel information supply device according to another embodiment of this invention;

FIG. 20 is a flow chart illustrating a transmitting portion selecting routine executed according to a program stored in the ROM of a wheel information generator of the vehicle wheel information supply device of FIG. 19;

FIG. 21 is a view schematically indicating a transmitting pattern stored in the ROM of the wheel information generator of FIG. 20;

FIG. 23 is a view schematically indicating a generating pattern stored in the ROM of a vehicle wheel information supply device according to still another embodiment of the present invention.

DETAILED DESCRIPTION OF THE PREFERRED EMBODIMENTS

There will be described a wheel state indicating device in the form of a wheel tire abnormality indicating device including a wheel information supply device constructed according to one embodiment of this invention.

Figure 1:
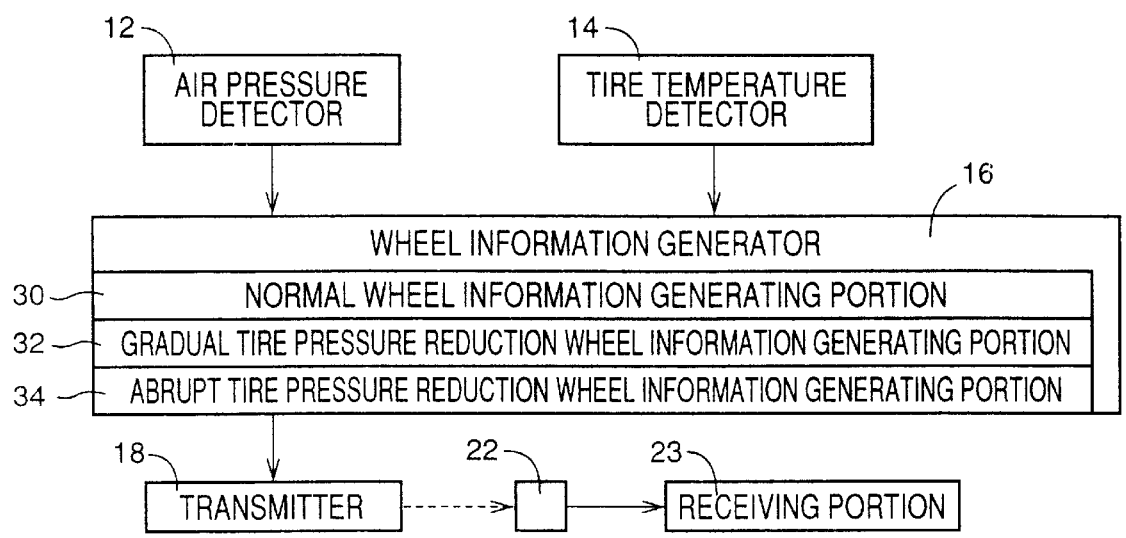
FIG. 1 is a block diagram showing a vehicle wheel information supply device constructed according to one embodiment of the invention.
Figure 2:
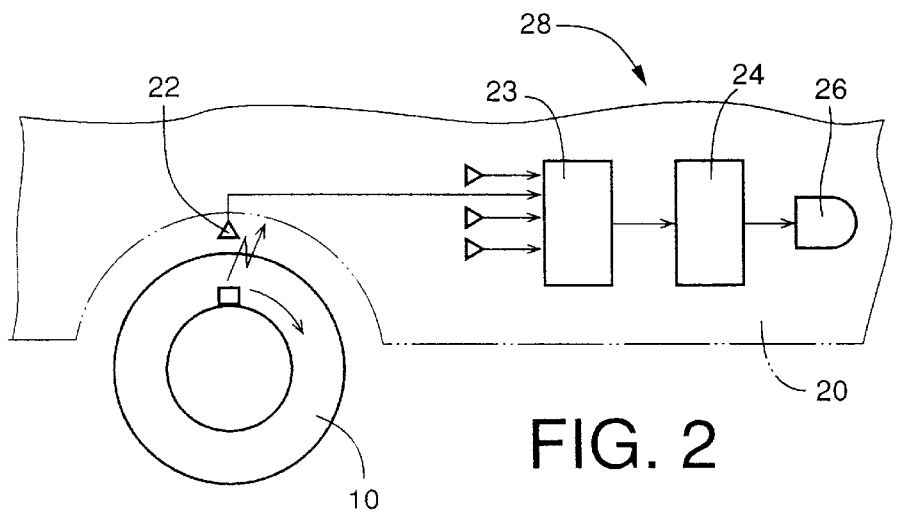
FIG. 2 is a schematic view showing a general arrangement of the vehicle wheel information supply device of FIG. 1.

Referring first to FIGS. 1 and 2, there are disposed on each of front right and left and rear right and left wheels 10 of an automotive vehicle, an air pressure detector 12 for detecting an air pressure in a tire of the corresponding wheel 10, a tire temperature detector 14 for detecting a temperature of the tire, a wheel information generator 16 for generating wheel information relating to a state of the wheel 10, and a transmitter 18 for transmitting the wheel information generated by the wheel information generator 16.

On a body 20 of the vehicle to which the wheels 10 are connected, there are disposed four antennas 22, a receiving portion 23 and a controller 24. The air pressure detector 12 is located at a portion of the wheel 10 at which a valve of the tire is located. The air pressure detector 12 generates an output signal while the air pressure of the wheel tire is higher than a given level, namely, while the tire air pressure is detectable. The four antennas 22 are located at respective positions at which the wheel information can be received from the respective transmitters 18 disposed on the respective four wheels 10.

The receiving portion 23 is adapted to receive, through the antennas 22, the wheel information transmitted by the transmitters 18. The receiving portion 23 is further adapted to modulate and amplify the wheel information, before the wheel information is fed to the controller 24, to which is connected an indicator 26. The controller 24 controls the indicator 26 to provide an indication of the state of each wheel 10, based on the received wheel information, so that the operator of the vehicle is informed of the state of each wheel 10. The indicator 26 is provided in a driver's compartment of the vehicle. It will be understood that the antennas 22, the receiving portion 23 and the controller 24 cooperate to constitute a receiver 28.

The wheel information generator 16 is principally constituted by a computer incorporating a central processing unit (CPU), a random-access memory (RAM), a read-only memory (ROM), an input portion and an output portion. To the input portion of the generator 16, there are connected the air pressure detector 12 and the tire temperature detector 14. To the output portion of the device 16, there is connected the transmitter 18. The ROM stores various programs such as a program for executing a wheel information generating portion selecting routine illustrated in the flow chart of FIG. 5, and a program for executing a normal wheel information generating routine illustrated in the flow chart of FIG. 6. The wheel information generator 16 includes a normal wheel information generating portion 30, a gradual tire pressure reduction wheel information generating portion 32, and an abrupt tire pressure reduction wheel information generating portion 34, as shown in FIG. 1. With the wheel information generating portion selecting routine of FIG. 5 being executed, one of the three wheel information generating portions 30, 32, 34 is selected, so that the wheel information is generated by the selected wheel information generating portion. The generated wheel information is transmitted by the transmitter 18 to the receiving portion 23 of the receiver 28.

Each of the normal wheel information generating portion 30, gradual tire pressure reduction wheel information generating portion 32 and abrupt tire pressure reduction wheel information generating portion 34 is constituted by a portion of the computer of the wheel information generator 16 which is assigned to store and implement a whole or a part of a program for generating a series of wheel information based on the detected tire air pressure, etc. However, those generating portions 30, 32, 34 may be constituted by respective exclusive computers or respective hardware circuits.

The controller 24 is also principally constituted by a computer incorporating a CPU, a RAM, a ROM, an input portion and an output portion. The ROM stores programs such as a program for executing an identification data registering routine illustrated in the flow chart of FIG. 7. With the identification data registering routine of FIG. 7 being executed, identification data received from the transmitter 18 are registered in the receiver 28.

On the basis of the tire air pressure detected by the air pressure detector 12 and a rate of change of the detected tire air pressure, the wheel information generator 16 selects and activates one of the three wheel information generating portions 30, 32, 34. The wheel information generated by the normal wheel information generating portion 30 has the largest volume, and the wheel information generated by the abrupt tire pressure reduction wheel information generating portion 34 has the smallest volume. It is also noted that the frequency of generation of the wheel information by the normal wheel information generating portion 30 is the lowest, while the frequency of generation of the wheel information by the abrupt tire pressure reduction wheel information generating portion 34 is the highest. These aspects will be further described.

Figure 8:
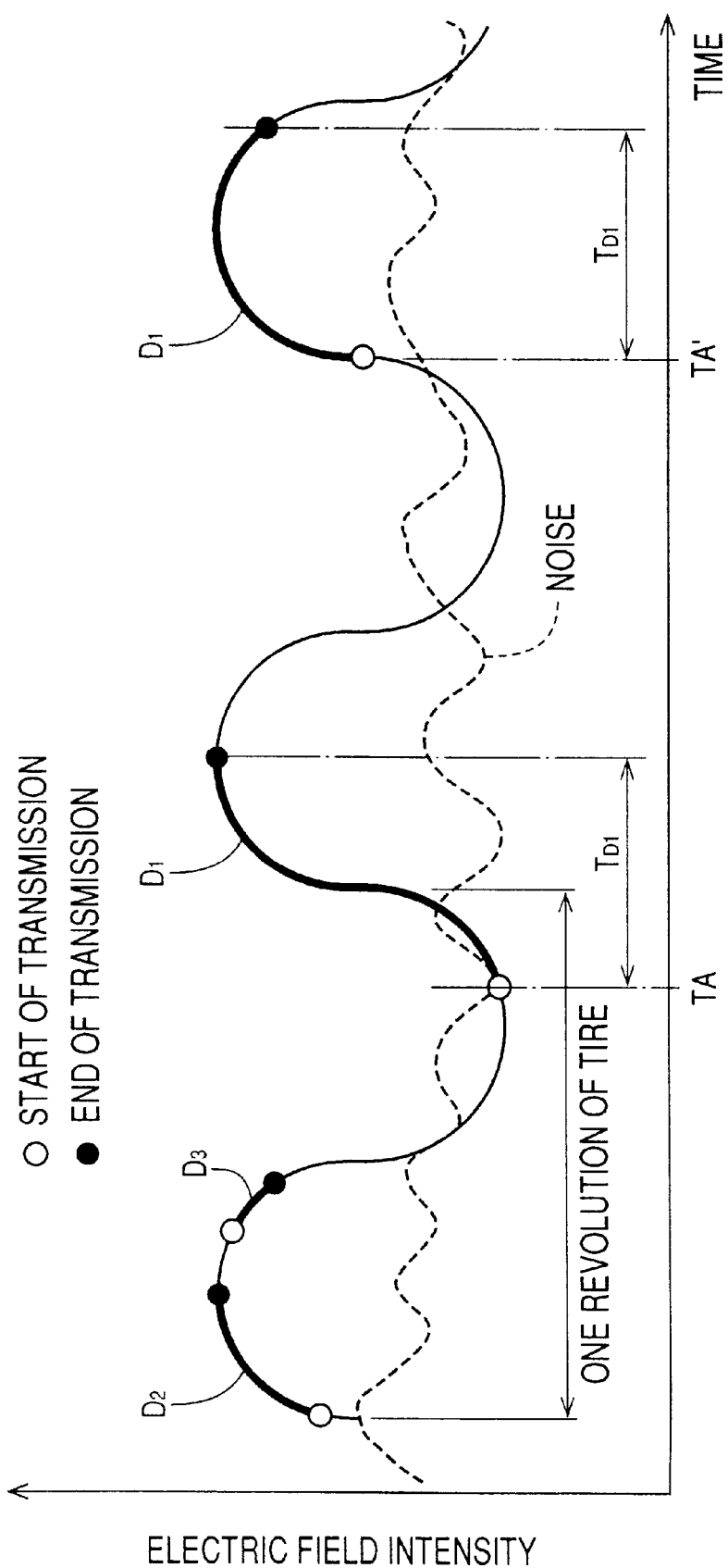
FIG. 8 is a view indicating a change in intensity of an electric shield between a transmitter and a receiver of the vehicle wheel information supply device of FIG. 1.

When information is transmitted from a transmitter disposed on a rotating vehicle wheel to a receiver disposed on a vehicle body, a distance between the transmitter and the receiver changes with the rotation of the wheel. Accordingly, the intensity of an electric field between these transmitter and receiver changes with a change in the distance, as indicated in the graph of FIG. 8. That is, the intensity of the information signal received by the receiver changes as indicated in FIG. 8. The information transmitted from the transmitter can be received by the receiver when the intensity of the electric field is sufficiently high. When the intensity of the electric field is low, the transmitted information may not be received by the receiver, due to an influence of a noise. While the intensity of the electric field is lower than that of the noise indicated by broken line in FIG. 8, the transmitted wheel information cannot be received.

Where a series of information $D_1$ is transmitted for a time period of $T_{D^1}$, as indicated in FIG. 8, the information $D_1$ cannot be received if the transmission of the information starts at a point of time TA, but can be received if the transmission starts at a point of time TA'. The probability of correct reception of the transmitted information is referred to as a reception ratio. The reception ratio increases with a decrease in the noise level and a decrease in the volume of the information transmitted (a decrease in the time period required to transmit the information). Although the reception ratio is relatively high when the information volume is relatively small as indicated at $D_2$ and $D_3$ in FIG. 8, the number of items represented by the information is relatively small. Therefore, the volume of the information to be transmitted must be determined by taking into account both the reception ratio and the desired number of items represented by the information.

Figure 9:
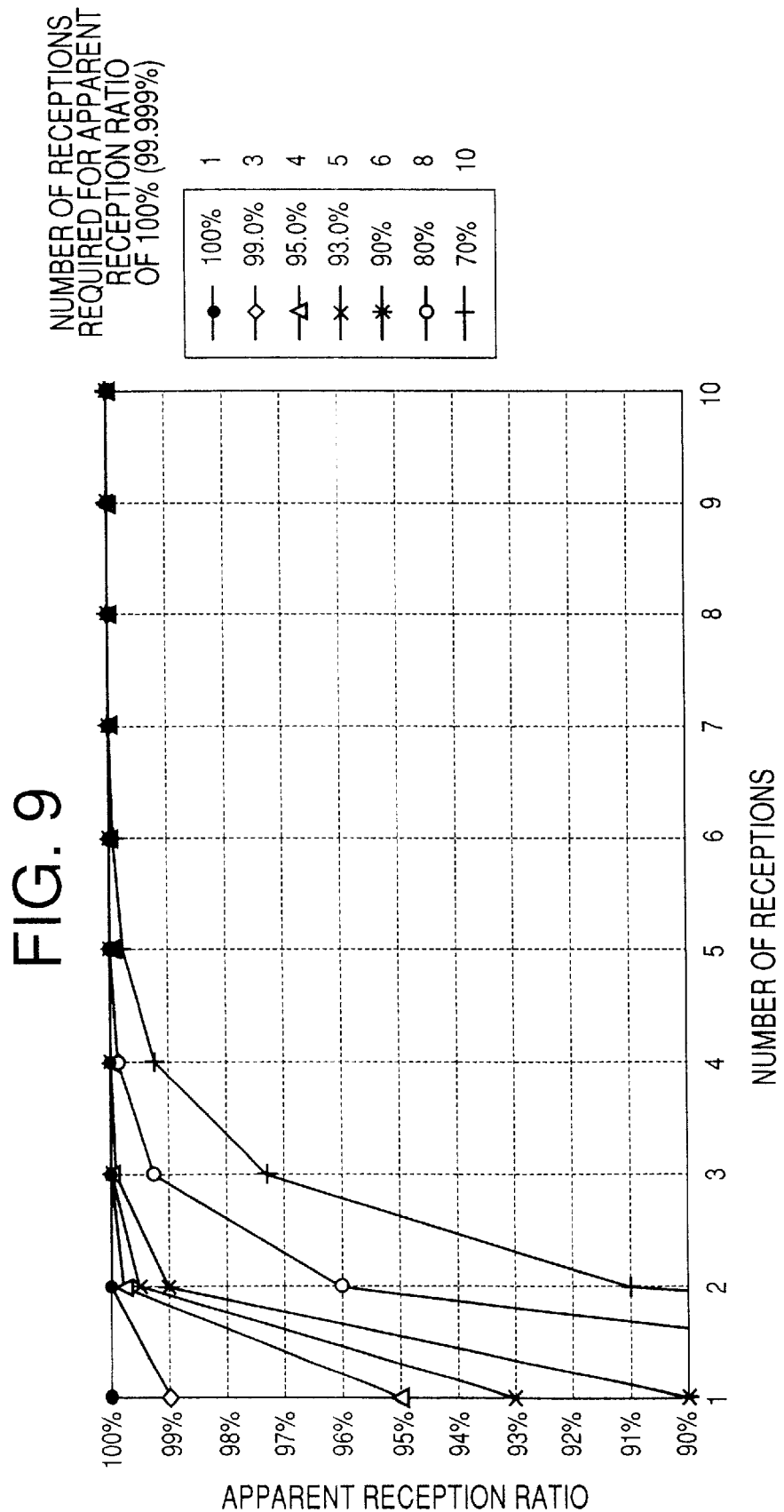
FIG. 9 is a graph indicating an apparent reception ratio of the receiver.

It is also noted that the apparent reception ratio increases with an increase in the number of receptions (transmissions) of the wheel information, as indicated in FIG. 9. In other words, where the reception ratio is low, the apparent reception ratio can be increased by increasing the number of receptions of the wheel information. Where the reception ratio is 100% (99.999% or higher) with one reception, the apparent reception ratio is 100%. Where the reception ratio is 99% with one reception, the apparent reception ratio can be increased to 100% with three receptions. Where the reception ratio is 80% with one reception, the apparent reception ratio can be increased to 100% with eight receptions.

Thus, the apparent reception ratio increases with a decrease in the volume of the wheel information (required transmission or reception time) and an increase in the number of receptions (transmissions). In view of this analysis, the present embodiment is arranged to reduce the volume of the wheel information and increase the frequency of transmission of the wheel information by the transmitter 18 (number of transmissions of the wheel information), where a need for correct reception of the wheel information by the receiver 28 is relatively high.

Figure 3:
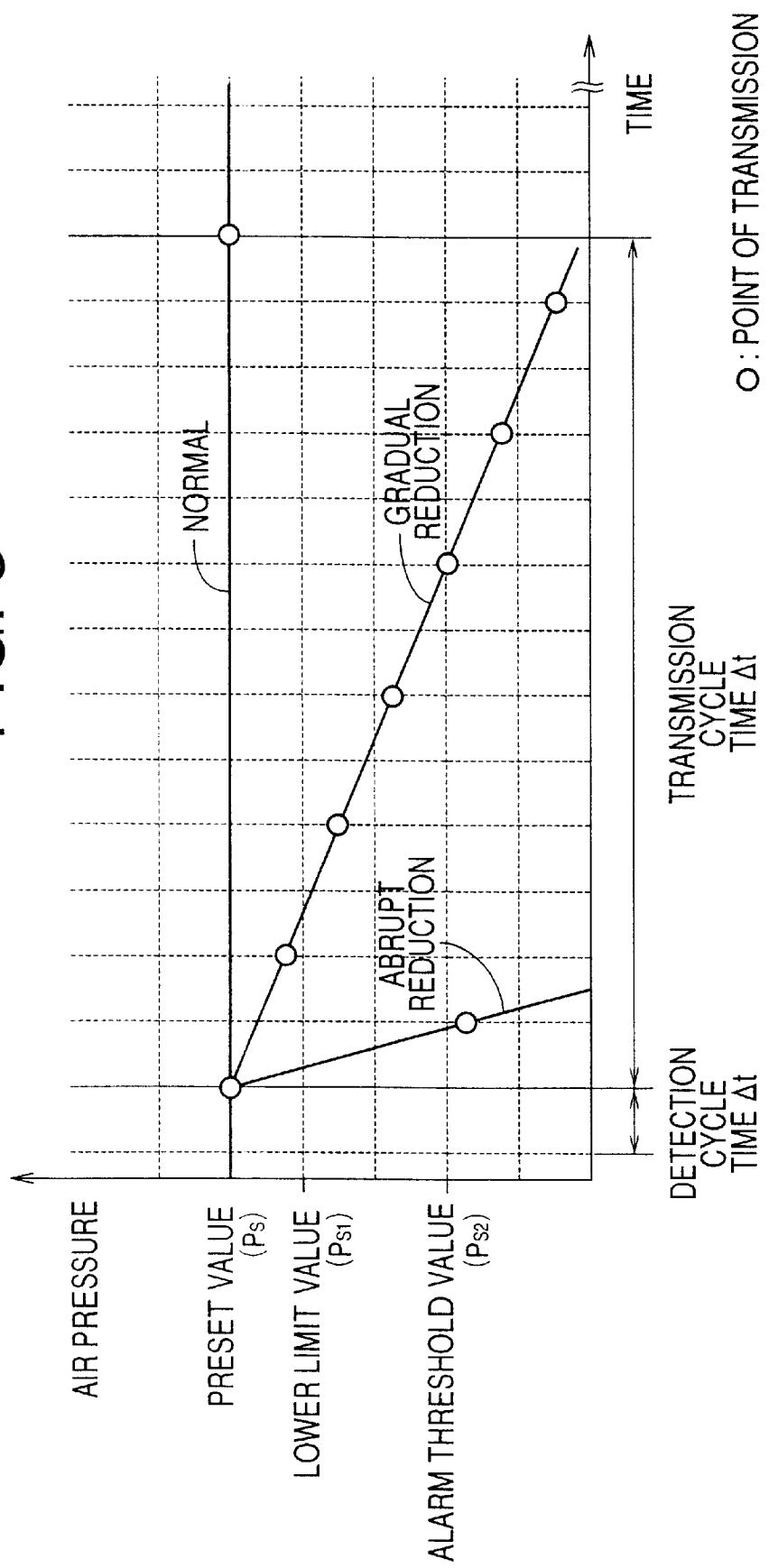
FIG. 3 is a graph illustrating an operation of the vehicle wheel information supply device of FIG. 1.

As shown in FIG. 3, the tire air pressure is detected intermittently at a time interval of $\Delta t$, namely, with a cycle time of $\Delta t$. When the detected tire air pressure is not lower than a preset value Ps, the wheel information generator 16 determines that the tire air pressure is normal, and selects and activates the normal wheel information generating portion 30 to generate NORMAL wheel information 50 indicated in FIG. 4. The NORMAL wheel information 50 consists of a header in the form of SYNCHRONIZATION data 51, TRAILER data 52, IDENTIFICATION data 53, AIR PRESSURE data 54, TIRE TEMPERATURE data 55, TRANSMISSION STATE data 56 and CHECK SUM data 57. The AIR PRESSURE data 54 represent the tire air pressure of the wheel 10, and the TIRE TEMPERATURE data 55 represent the temperature of the tire. The TRANSMISSION STATE data 56 consist of TRANSMISSION STATE data 1 and TRANSMISSION STATE data 2. The NORMAL wheel information 50 is generated by the normal wheel information generating portion 30, with the cycle time of $\Delta T$, which is considerably longer than the cycle time $\Delta t$ with which the tire air pressure is detected. To generate the NORMAL wheel information 50, the outputs of the air pressure detector 12 and the tire temperature detector 14 are read into the wheel information generator 16.

It will be understood that the AIR PRESSURE data 54 and the TIRE TEMPERATURE data 55 serve as primary information, while the SYNCHRONIZATION data 51, TRAILER data 52, IDENTIFICATION data 53, TRANSMISSION STATE data 56 and CHECK SUM data 57 serve as ancillary data. It will also be understood that the SYNCHRONIZATION data 51 and the TRAILER data 52 of the ancillary data serve as header/trailer data.

The TRAILER data 52 indicate the end of the NORMAL wheel information 50, and represents a predetermined total volume of the NORMAL wheel information 50, which is different from the total volumes of ABRUPT TIRE PRESSURE REDUCTION wheel information 60 and GRADUAL TIRE PRESSURE REDUCTION wheel information 70 which are generated by the abrupt tire pressure reduction wheel information generating portion 34 and the gradual tire pressure reduction wheel information generating portion 32, respectively. In other words, the NORMAL wheel information 50, ABRUPT TIRE PRESSURE REDUCTION wheel information 60 and GRADUAL TIRE PRESSURE REDUCTION wheel information 70 have respective different predetermined total volumes, as described below. Thus, the total volume of the wheel information indicates whether the wheel 10 is in the normal state, or in the state of abrupt or gradual reduction of its tire air pressure.

Figure 4:
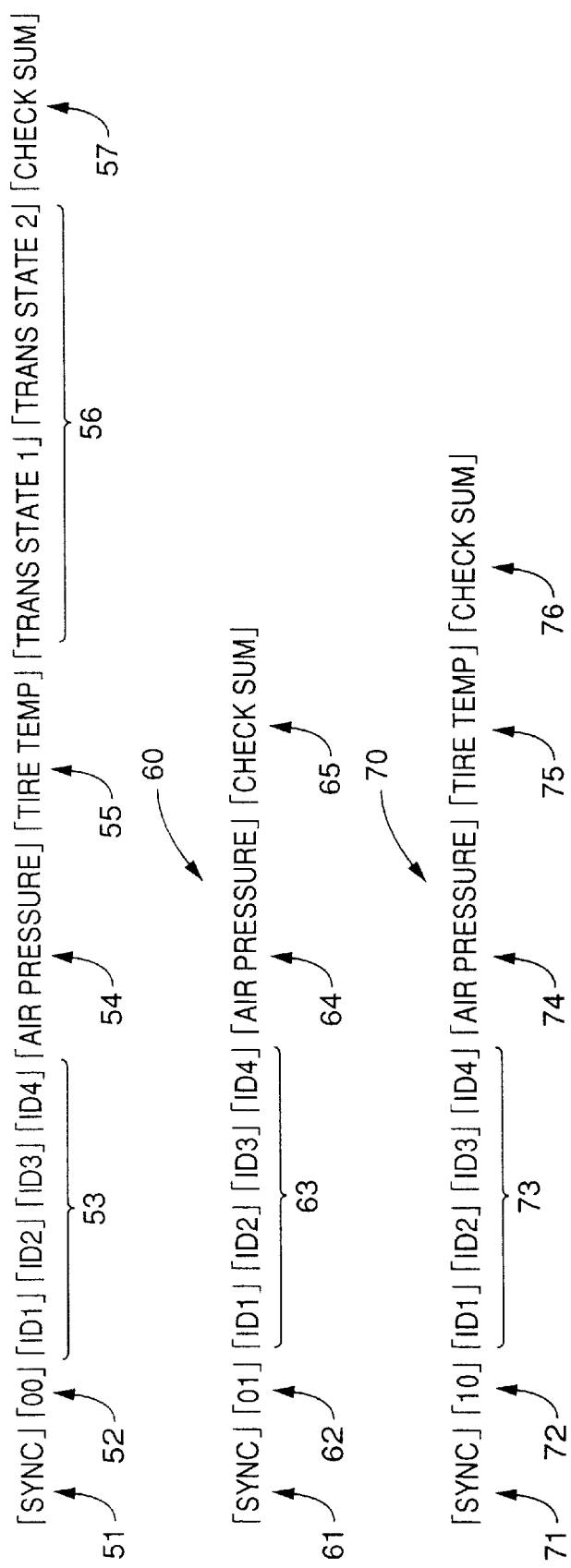
FIG. 4 is a view illustrating a series of wheel information generated by a wheel information generator device of the vehicle wheel information supply device of FIG. 1.

In FIG. 4, the data 51–57 are indicated as [SYNC] [00] [ID1][ID2][ID3][ID4] [AIR PRESSURE] [TIRE TEMP] [TRANS STATE 1][TRANS STATE 2] [CHECK SUM]. The data [00] constitute the TRAILER data 52, and the data [ID1][ID2][ID3][ID4] constitute the IDENTIFICATION data 53, while the data [TRANS STATE 1][TRANS STATE 2] constitute the TRANSMISSION STATE data 56. Each of [SYNC], [ID1], [ID2], [ID3], [ID4], [AIR PRESSURE], [TIRE TEMP], [TRANS STATE 1], [TRANS STATE 2] and [CHECK SUM] is a one byte volume. Since the data [00] (TRAILER data 52) is 0.5 byte, the total volume of the NORMAL wheel information 50 is 10.5 bytes. In the ABRUPT TIRE PRESSURE REDUCTION wheel information 60 and the GRADUAL TIRE PRESSURE REDUCTION wheel information 70, TRAILER data 62 and TRAILER data 72 are [01] and [10], respectively. Where the TRAILER data are [00], it indicates that the TRAILER data [00] is contained in the NORMAL wheel information 50 whose total volume is 10.5 bytes and that the tire air pressure of the corresponding wheel 10 is normal. In this respect, the TRAILER data 52, 62, 72 are considered to be air pressure information indicative of the tire air pressure. Further, the TRAILER data 52, 62, 72 representing the total volume of the wheel information 50, 60, 70 may be considered to be transmission volume information indicative of the total volume of the wheel information transmitted. Thus, the TRAILER data 52, 62, 72 serve as the air pressure information (which can be considered as the primary information), transmission volume information, and ancillary information (header/trailer information).

The IDENTIFICATION data 53 are provided to check if the wheel information transmitted from the transmitter 18 disposed on each of the four wheels 10 is received by the corresponding one of the four receiving portions 23 of the receiver 28 disposed at the respective positions on the vehicle body 20, which positions correspond to the respective four wheels 10. The data sets [ID1], [ID2], [ID3] and [ID4] of the IDENTIFICATION data 53 correspond to the respective four receiving portions 23, that is, respective four wheels 10. Before the wheel information is transmitted from the transmitter 18, the data sets [ID1], [ID2], [ID3] and [ID4] are sent to the receiver 28, so as to be registered in the receiver 28, in relation to the respective receiving portions 23 or wheels 10. When the wheel information is transmitted from the transmitter 18 for the particular wheel 10, the IDENTIFICATION data 53 contained in the wheel information are compared with the data sets registered in the receiver 28, to confirm that the transmitter 18 from which the wheel information is transmitted corresponds to the appropriate receiving portion 23 or wheel 10.

The registration of the IDENTIFICATION data is automatically effected when the air pressure in the tire of the wheel 10 is raised to a level detectable by the air pressure detector 12 upon attachment of each wheel 10 to the vehicle body 20. At this time, the transmitter 18 for the wheel 10 in question transmits to the receiver 28 the IDENTIFICATION data together with a REGISTRATION MODE signal. After the receiver 28 is attached to the vehicle body 20, the receiver 28 is held in a RECEPTION STANDBY mode in which wheel information transmitted by the transmitter 18 is receivable. To register the IDENTIFICATION data, the receiver 28 must be brought into a REGISTRATION mode. This REGISTRATION mode is established when the receiver 28 has received the REGISTRATION MODE signal from the transmitter 18. In this REGISTRATION mode, the IDENTIFICATION data transmitted from the transmitter 18 can be registered in the receiver 28. This arrangement does not require the receiver 28 to have an exclusive operator-controlled switch for changing the mode from the RECEPTION STANDBY mode to the REGISTRATION mode. The IDENTIFICATION data follow the REGISTRATION MODE signal, without any information interlaced therebetween, so that the IDENTIFICATION data received from the transmitter 18 can be correctly registered in the receiver 28 with high stability.

Figure 7:
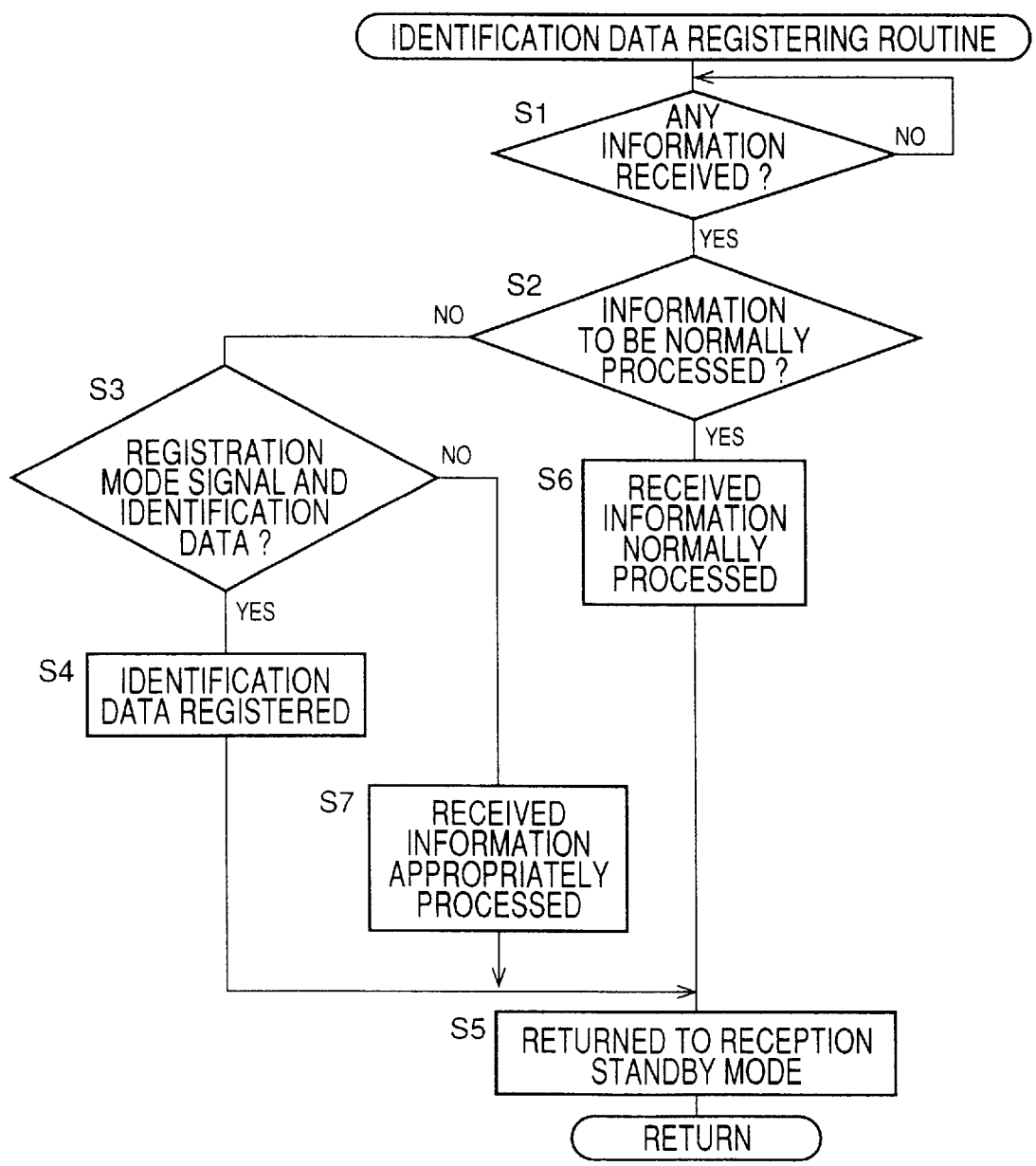
FIG. 7 is a flow chart illustrating an identification data registering routine executed according to a program stored in the ROM of the wheel information generator device.

The IDENTIFICATION data are registered in the receiver 28, with the controller 24 executing the identification data registering routine illustrated in the flow chart of FIG. 7. This routine is initiated with step S1 to determine whether any information is received. If an affirmative decision (YES) is obtained in step S1, the control flow goes to step S2 to determine whether the information received is the wheel information (tire air pressure, etc.) or other information that is to be normally processed. If a negative decision (NO) is obtained in step S2, the control flow goes to step S3 to determine whether the information received is the REGISTRATION MODE signal and the IDENTIFICATION data. If an affirmative decision (YES) is obtained in step S3, the control flow goes to step S4 in which the REGISTRATION mode is established, and the IDENTIFICATION data are registered in the controller 24. Then, the control flow goes to step S5 in which the receiver 28 is returned to the RECEPTION STANDBY mode. With the IDENTIFICATION data registered for all wheels 10, the wheel information received by the receiver 28 is related to the corresponding one of the receiving portions 23 (wheels 10). In the present embodiment, the IDENTIFICATION data 53 to be registered include [ID1], [ID2], [ID3] and [ID4] indicated above, and [ID4] and [ID5] which will be described.

If the information received in step S1 is neither the information that is to be normally processed, nor a combination of the REGISTRATION MODE signal and the IDENTIFICATION data, a negative decision (NO) is obtained in steps S2 and S3, and the control flow goes to step S7 in which the received information is processed in a manner corresponding to the kind of the information. If an affirmative decision (YES) is obtained in step S2, the control flow goes to step S6 in which the information received is processed in the normal manner. Step S6 and S7 are also followed by the above-indicated step S5 so that the receiver 28 is returned to the RECEPTION STANDBY mode.

The TRANSMISSION STATE data 56 indicate the state of transmission of the NORMAL wheel information 50, and include data indicating whether the transmitter 18 in question is normal, and data indicative of the residual amount of electric energy left (voltage) in a battery used in the transmitter 18. The SYNCHRONIZATION data 51 ([SYNC]) are provided for synchronization of the transmitter 18 with the receiver 28.

When the detected tire air pressure of the wheel 10 is normal, a need of transmitting the NORMAL wheel information 50 so as to assure correct reception thereof is relatively small, and the reception ratio of the NORMAL wheel information 50 need not be so high. In view of this, the total volume of the NORMAL wheel information 50 may be relatively large, and the frequency of transmission of this information 50 need not be so high.

Where the detected tire air pressure is lower than the preset value Ps and is lowered abruptly at a rate higher than a predetermined threshold, the wheel information generator 16 selects and activates the abrupt tire pressure reduction wheel information generating portion 34, and this generating portion 34 generates the ABRUPT TIRE PRESSURE REDUCTION wheel information 60, which consists of SYNCHRONIZATION data 61, TRAILER data 62, IDENTIFICATION data 63, AIR PRESSURE data 64 and CHECK SUM data 65, as indicated in FIG. 4. That is, the ABRUPT TIRE PRESSURE REDUCTION wheel information 60 does not include TIRE TEMPERATURE data and TRANSMISSION STATE data, and the total volume of the wheel information 60 is 7.5 bytes. The AIR PRESSURE data 64 serve as the primary information, while the SYNCHRONIZATION data 61, TRAILER data 62, IDENTIFICATION data 63 and CHECK SUM data 65 serve as the ancillary data. The SYNCHRONIZATION data 61 and the TRAILER data 62 serve as the header/trailer information. The TRAILER data 62 in the wheel information 60 is [01], which indicates that the tire air pressure is lower than the preset value Ps and is abruptly lowered. The ABRUPT TIRE PRESSURE REDUCTION wheel information 60 is generated and transmitted with the cycle time of Δt, which is the cycle time of detection of the tire air pressure. As indicated above, the volume of the wheel information 60 is made relatively small, and the frequency of transmission of this wheel information 60 is made relatively high, in order to increase the reception ratio on the side of the receiver 28.

Where the detected tire air pressure is lower than the preset value Ps but the rate of its reduction is not higher than the predetermined threshold, the generator 16 selects and activates the gradual tire pressure reduction wheel information generating portion 32, and this generating portion 32 generates the GRADUAL TIRE PRESSURE REDUCTION wheel information 70, which consists of SYNCHRONIZATION data 71, TRAILER data 72, IDENTIFICATION data 73, AIR PRESSURE data 74, TIRE TEMPERATURE data 75 and CHECK SUM data 76. The GRADUAL TIRE PRESSURE REDUCTION wheel information 70 does not include TRANSMISSION STATE data, and the total volume of the wheel information 70 is 8.5 bytes, which is intermediate between the total volumes of the NORMAL wheel information 50 and the ABRUPT TIRE PRESSURE REDUCTION wheel information 60. The TRAILER data 72 in this wheel information 70 is [10], which indicates that the tire air pressure is lower than the preset value Ps and is gradually lowered at a rate lower than the predetermined threshold. The wheel information 70 including the AIR PRESSURE data 74 and TIRE TEMPERATURE data 75 is generated and transmitted with a cycle time of 2×Δt. As indicated above, the total volume of the wheel information 70 is smaller than that of the NORMAL wheel information 50, and the frequency of transmission of the wheel information 70 is higher than that of the wheel information 50, so that the reception ratio of the wheel information 70 is made higher.

The wheel information received by the receiving portion 23 is supplied to the controller 24, and the indicator 26 is controlled by the controller 24, depending upon the content of the wheel information received. When the NORMAL wheel information 50 or the GRADUAL TIRE PRESSURE REDUCTION wheel information 60 is received, the indicator 26 is controlled to indicate both the tire air pressure and the tire temperature. When the ABRUPT TIRE PRESSURE REDUCTION wheel information 70 is received, the indicator 26 is controlled to indicate only the tire air pressure and activate an alarm light provided thereon, in order to inform the vehicle operator or driver of an abrupt reduction of the tire air pressure of the wheel 10 corresponding to the transmitter 18 from which the wheel information 70 is received.

An operation of the wheel information generator 16 will be described by reference to the flow chart of FIG. 5, which illustrates the wheel information generating portion selecting routine, which is executed with a cycle time equal to the cycle time Δt with which the tire air pressure is detected by the air pressure sensor 12.

Figure 5:
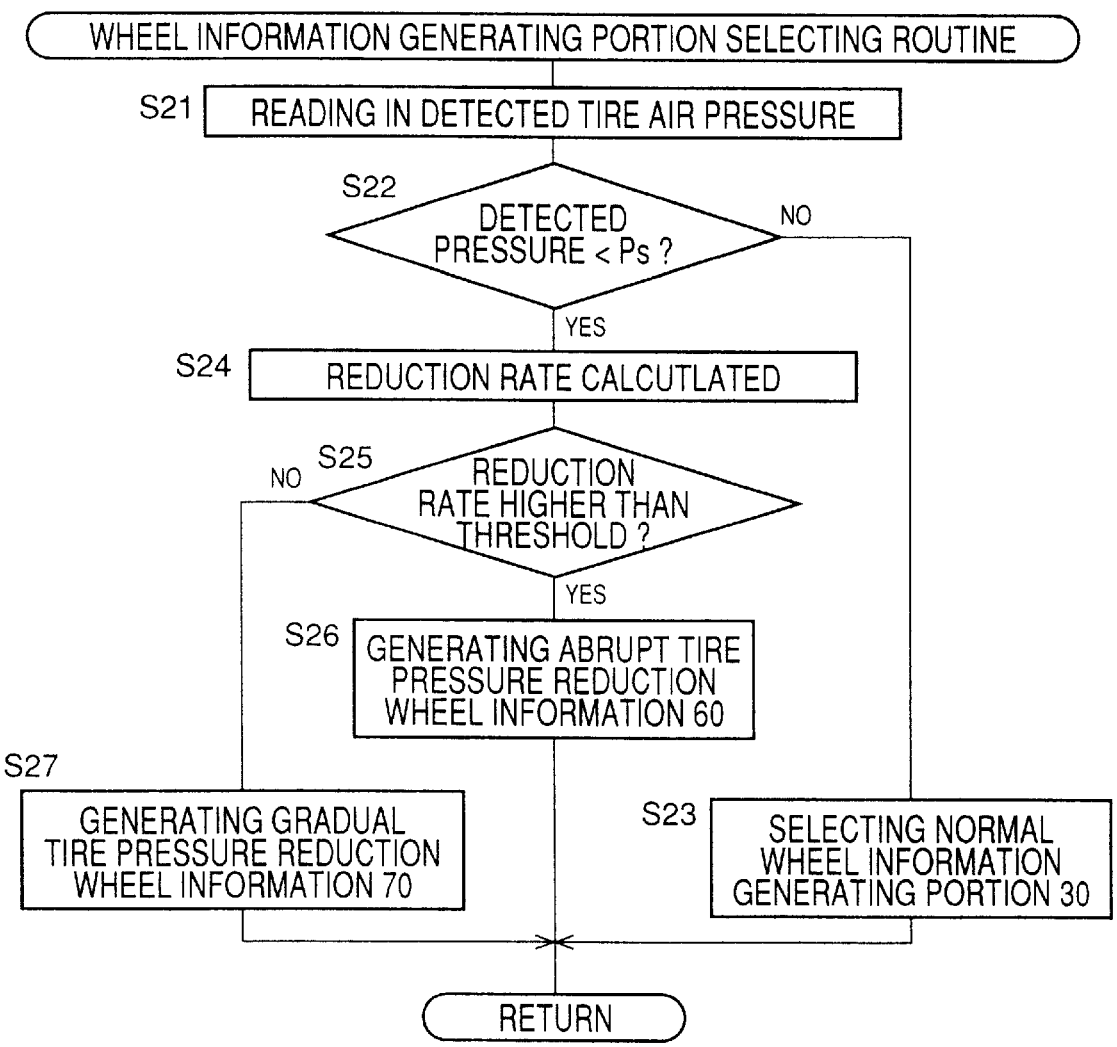
FIG. 5 is a flow chart illustrating a wheel information generating portion selecting routine executed according to a program stored in a ROM of the wheel information generator.

The routine of FIG. 5 is initiated with step S21 to read in the detected tire air pressure of each wheel 10. Step S21 is followed by step S22 to determine whether the detected tire air pressure is lower than the preset value Ps. If a negative decision (NO) is obtained in step S22, the control flow goes to step S23 in which the normal wheel information generating portion 30 is selected.

The normal wheel information generating portion 30 generates the NORMAL wheel information 50 with the cycle time ΔT, which is considerably longer than the cycle time Δt. The generated NORMAL wheel information 50 is sent to the appropriate transmitter 18, which transmits the wheel information 50 to the receiving portion 23 of the receiver 28.

Figure 6:
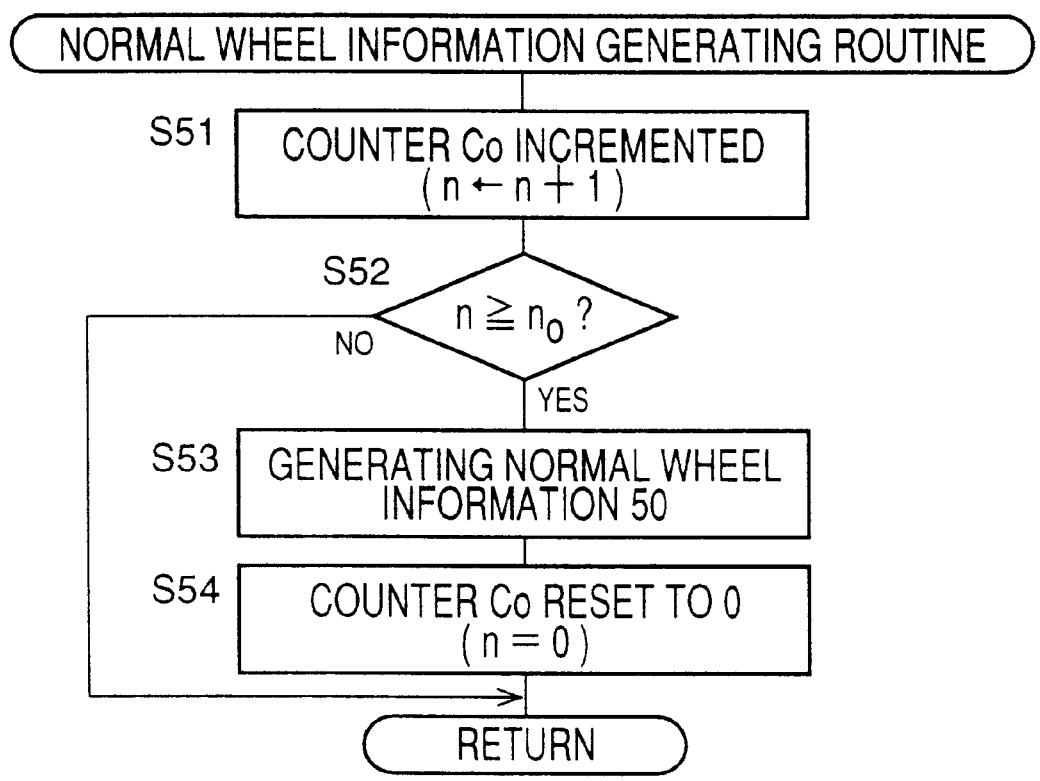
FIG. 6 is a flow chart illustrating a normal wheel information generating routine executed according to a program stored in the ROM of the wheel information generator.

When step S23 is initially implemented to select the normal wheel information generating portion 30, a normal wheel information generating routine is started by the wheel information generator 16, as illustrated in the flow chart of FIG. 6, to generate the NORMAL wheel information 50 with the cycle time ΔT, while the wheel information generating portion selecting routine of FIG. 5 is repeatedly implemented with the cycle time of Δt. That is, each time step S23 is implemented, a counter Co is incremented, and the NORMAL wheel information 50 is generated by the selected generating portion 30 when the content "n" of the counter Co has been increased to a predetermined value "$n_0$" which corresponds to the cycle time ΔT.

The normal wheel information generating routine of FIG. 6 is initiated with step S51 in which the content "n" of a counter Co is incremented to "n+1". Then, step S52 is implemented to determine whether the content "n" is equal to or larger than the predetermined value "$n_0$". If a negative decision (NO) is obtained in step S52, one cycle of execution of the routine of FIG. 6 is terminated, and the NORMAL wheel information 50 is not generated by the generating portion 30. If an affirmative decision (YES) is obtained in step S52, the control flow goes to step S53 in which the normal wheel information generating portion 30 generates the NORMAL wheel information 50. Step S53 is followed by step S54 to reset the counter Co.

If the detected tire air pressure is lower than the present value Ps, an affirmative decision (YES) is obtained in step S22 of the routine of FIG. 5, and the control flow goes to step S24 in which the rate of reduction of the tire air pressure is calculated. Step S22 is followed by step S25 to determine whether the calculated rate of reduction of the tire air pressure is higher than the predetermined threshold or not. If an affirmative decision (YES) is obtained in step S25, the control flow goes to step S26 in which the abrupt tire pressure reduction wheel information generating portion 34 is selected and activated to generate the ABRUPT TIRE PRESSURE REDUCTION wheel information 60, so that the generated wheel information 60 is transmitted to the receiver 28. Thus, the wheel information 60 is generated each time step S26 is implemented, namely, with the cycle time of Δt.

If the rate of reduction of the detected tire air pressure is not higher than the threshold, a negative decision (NO) is obtained in step S25, and the control flow goes to step S27 in which the gradual tire pressure reduction wheel information generating portion 32 is selected and activated, to generate the GRADUAL TIRE PRESSURE REDUCTION wheel information 70.

When step S27 is initially implemented to select the gradual tire pressure reduction wheel information generating portion 32, a routine similar to the routine of FIG. 6 is started. In this routine, the GRADUAL TIRE PRESSURE REDUCTION wheel information 70 is generated by the generating portion 32 when the content "n" of the counter Co has increased to a predetermined value corresponding to the cycle time 2Δt, so that the wheel information 70 is generated with the cycle time 2Δt. The generated wheel information 70 is transmitted to the receiver 28.

As described above, the wheel information supply device according to the present embodiment is arranged such that the volumes of the ABRUPT TIRE PRESSURE REDUCTION wheel information 60 and the GRADUAL TIRE PRESSURE REDUCTION wheel information 70 which are required to be received by the receiver 28 with relatively high reception ratios are made relatively small, while the frequencies of transmission of those wheel information 60, 70 are made relatively high, so as to increase the reception ratios of those wheel information 60, 70. The thus increased reception ratios of the wheel information 60, 70 result in reduction in the times that are required for the receiver 28 to correctly receive the wheel information 60, 70. It is also noted that the residual electric energy amount stored in the battery of each transmitter 18 decreases with an increase in the cumulative information transmitting time. In this respect, it is effective to increase the reception ratios by reducing the volumes of the wheel information.

It will be understood that the normal wheel information generating portion 30 constitutes a first wheel information generating portion, while the gradual tire pressure reduction wheel information generating portion 32 and the abrupt tire pressure reduction wheel information generating portion 34 cooperate to constitute a second wheel information generating portion. The first and second wheel information generating portions may be considered to be a normal wheel information generating portion and an abnormal wheel information generating portion, respectively. The normal and abnormal wheel information generating portions may be adapted to generate a normal wheel information when the detected tire air pressure is not lower than the preset value Ps, and an abnormal wheel information when the detected tire air pressure is lower than the present value Ps. It is also possible to consider that one of the gradual and abrupt tire pressure reduction wheel information generating portions 32, 34 constitutes a second wheel information generating portion while the other of the generating portions 32, 34 constitutes a third wheel information generating portion.

The wheel information generator 16 may be considered to generate different volumes of wheel information, depending upon the detected tire air pressure and the rate of reduction of the detected tire air pressure. In the present embodiments, these different sets of wheel information 50, 60, 70 are generated by the respective wheel information generating portions 30, 34, 32, which are selected and activated depending upon the detected tire air pressure and its rate of reduction. Namely, the normal wheel information generating portion 30 is activated when the detected tire air pressure is not lower than the preset value, and the abrupt tire pressure reduction wheel information generating portion 34 is activated when the detected tire air pressure is lower than the preset value and is lowered at a rate higher than the predetermined threshold. Further, the gradual tire pressure reduction wheel information generating portion 32 is activated when the detected tire air pressure is lower than the preset value and is lowered at a rate not higher than the threshold. Each time the wheel information is generated by the generator 16, the generated wheel information is transmitted from the appropriate transmitter 18 to the receiver 28 in the predetermined manner.

While the wheel information generator 16 is adapted such that the sets of wheel information 50, 60, 70 generated by the three generating portions 30, 34, 32 are transmitted at different frequencies or with different cycle times ($\Delta T$, $\Delta t$ and $2\Delta t$), the transmitter 18 may include a plurality of transmitting portions, for instance, a high-frequency transmitting portion, a medium-frequency transmitting portion and a low-frequency transmitting portion, which are selectively activated. In this case, the low-frequency transmitting portion is activated to transmit the wheel information generated by the generator 16, when the detected tire air pressure is not lower than the preset value, and the high-frequency transmitting portion is activated to transmit the generated wheel information, when the detected tire air pressure is lower than the preset value and is lowered at a value higher than the predetermined threshold. The medium-frequency transmitting portion is activated to transmit the generated wheel information when the detected tire air pressure is lower than the preset value and is lowered at a value not higher than the threshold. Further, the wheel information generating portions 30, 32, 34 of the generator 16 are adapted to generate the respective sets of information 50, 70, 60 with the same cycle time ($\Delta t$) in the predetermined manners.

Described more specifically, when the low-frequency transmitting portion is selected, the NORMAL wheel information 50 having the largest volume is transmitted with the longest cycle time of $\Delta T$. When the high-frequency transmitting portion is selected, the ABRUPT TIRE PRESSURE REDUCTION wheel information 60 having the smallest volume is transmitted with the shortest cycle time of $\Delta t$. When the medium-frequency transmitting portion is selected, the GRADUAL TIRE PRESSURE REDUCTION wheel information 70 having the medium volume is transmitted with the medium cycle time of $2\Delta t$.

The three wheel information generating portions 30, 32, 34 of the wheel information generator 16 may cooperate with the three transmitting portions of the transmitter 18 to transmit the appropriate wheel information with the appropriate cycle time, depending upon the detected tire air pressure and its rate of reduction. For instance, when the detected tire air pressure is not lower than the preset value, the normal wheel information generating portion 30 is activated, and the low-frequency transmitting portion is activated to transmit the wheel information generated by the generating portion 30. When the detected tire air pressure is lower than the preset value and is lowered at a rate higher than the predetermined threshold, the abrupt air pressure reduction wheel information generating portion 34 is activated, and the high-frequency transmitting portion is activated to transmit the wheel information generated by the generating portion 34. When the tire air pressure is lower than the preset value and is lowered at a rate not higher than the threshold, the gradual tire pressure reduction wheel information generating portion 32 is activated, and the medium-frequency transmitting portion is activated to transmit the wheel information generated by the generating portion 32.

Figure 10:
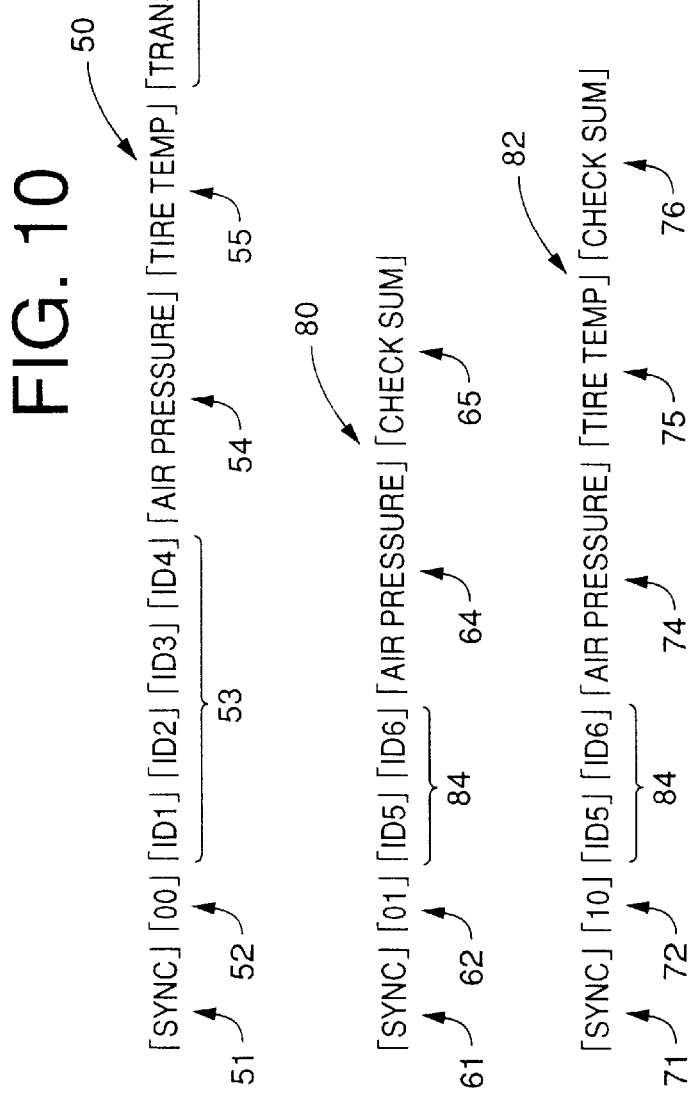
FIG. 10 is a view illustrating another series of wheel information generated by the wheel information generator.

Referring next to FIG. 10, there is illustrated a second embodiment of this invention wherein the wheel information generating device 16 is adapted to generate the NORMAL wheel information 50 as in the first embodiment, and ABRUPT TIRE PRESSURE REDUCTION wheel information 80 and GRADUAL TIRE PRESSURE REDUCTION wheel information 82 each of which includes IDENTIFICATION data 84 consisting of [ID5] and [ID6]. The volume of the IDENTIFICATION data 84 is smaller than that of the IDENTIFICATION data 53 included in the NORMAL wheel information 50. The volumes of the wheel information 80 and the wheel information 82 in the present second embodiment are 5.5 bytes and 6.5 bytes, respectively, which are smaller than those (7.5 bytes and 8.5 bytes) of the wheel information 60 and the wheel information 70. The TRAILER data 62 in the wheel information 80 indicates the total volume of 5.5 bytes of the wheel information 80, while the TRAILER data 72 in the wheel information 82 indicates the total volume of 6.5 bytes of the wheel information 82.

According to a third embodiment of this invention, the wheel information generator 16 may be adapted to generate an ABRUPT TIRE PRESSURE REDUCTION wheel information 90 shown in FIG. 11. This wheel information 90 does not include AIR PRESSURE data, and the total volume is further reduced to 4.5 bytes, to increase the reception ratio. The TRAILER data 92 consisting of [11] indicates that the detected tire air pressure is abruptly lowered. Although the wheel information 90 does not enable the indicator 26 to provide an indication of the detected tire air pressure, the wheel information 90 activates the alarm light of the indicator 26, informing the vehicle operator that the tire air pressure of the wheel 10 in question is abnormal. In this respect, it is noted that the indication of the tire air pressure is not usually essential or necessary, provided that the abnormal condition of the wheel tire is indicated. Thus, the wheel information 90 is sufficient in most cases. The wheel information 90 may be considered to be information for providing an alarm regarding the wheel tire condition, or information for indicating an abnormality of the wheel tire.

In the above embodiments, the volume of the wheel information is made smaller and the cycle time of generation (transmission) of the wheel information is made shorter when the detected tire air pressure is lower than the preset value Ps than when it is not lower than the preset value Ps. However, only the volume or the cycle time of generation of the wheel information may be made smaller or shorter. In this case, too, the reception ratio of the wheel information can be increased. While the above embodiments are adapted such that the alarm light of the indicator 26 is activated only when the detected tire air pressure is abruptly lowered, the alarm light may be activated also when the tire air pressure is gradually or slowly lowered. Alternatively, the alarm light may be activated when the tire air pressure is lowered below a predetermined alarm threshold value $Ps_2$ (FIG. 3) lower than the preset value Ps, while the pressure is lowered at a rate higher than the predetermined threshold. Further alternatively, the alarm light may be activated when the tire air pressure is lowered below the alarm threshold value $Ps_2$, irrespective of the rate of lowering of the air pressure. The alarm light may be replaced by any other indicator means such as a buzzer or any other means for providing a warning sound or voice message.

It is also possible to set three ranges of the tire air pressure defined by a lower limit value $Ps_1$ lower than the preset value Ps, and the above-indicated alarm threshold value $Ps_2$ lower than the lower limit value $Ps_1$, and select one of the three wheel information generating portions 30, 32, 34, depending upon one of those three ranges in which the detected air pressure lies.

In the first embodiment of FIG. 4, the IDENTIFICATION data 53 (63, 73) are registered in the receiver 28. In the embodiment of FIG. 11, the IDENTIFICATION data 84 are registered in the receiver 28. However, a part (at least one of [ID1], [ID2], [ID3] and [ID4]) of the IDENTIFICATION data 53 may be replaced by the IDENTIFICATION data 84, to reduce the volume of the IDENTIFICATION data registered in the receiver 28. For instance, the IDENTIFICATION DATA may consist of [ID], [ID2], [ID5] and [ID6], or [ID3], [ID4], [ID5] and [ID6].

In the above embodiments, the IDENTIFICATION data are transmitted by the transmitter 18, immediately following the REGISTRATION MODE signal. However, the IDENTIFICATION data may be transmitted a predetermined time after the transmission of the REGISTRATION MODE signal.

Figure 14:
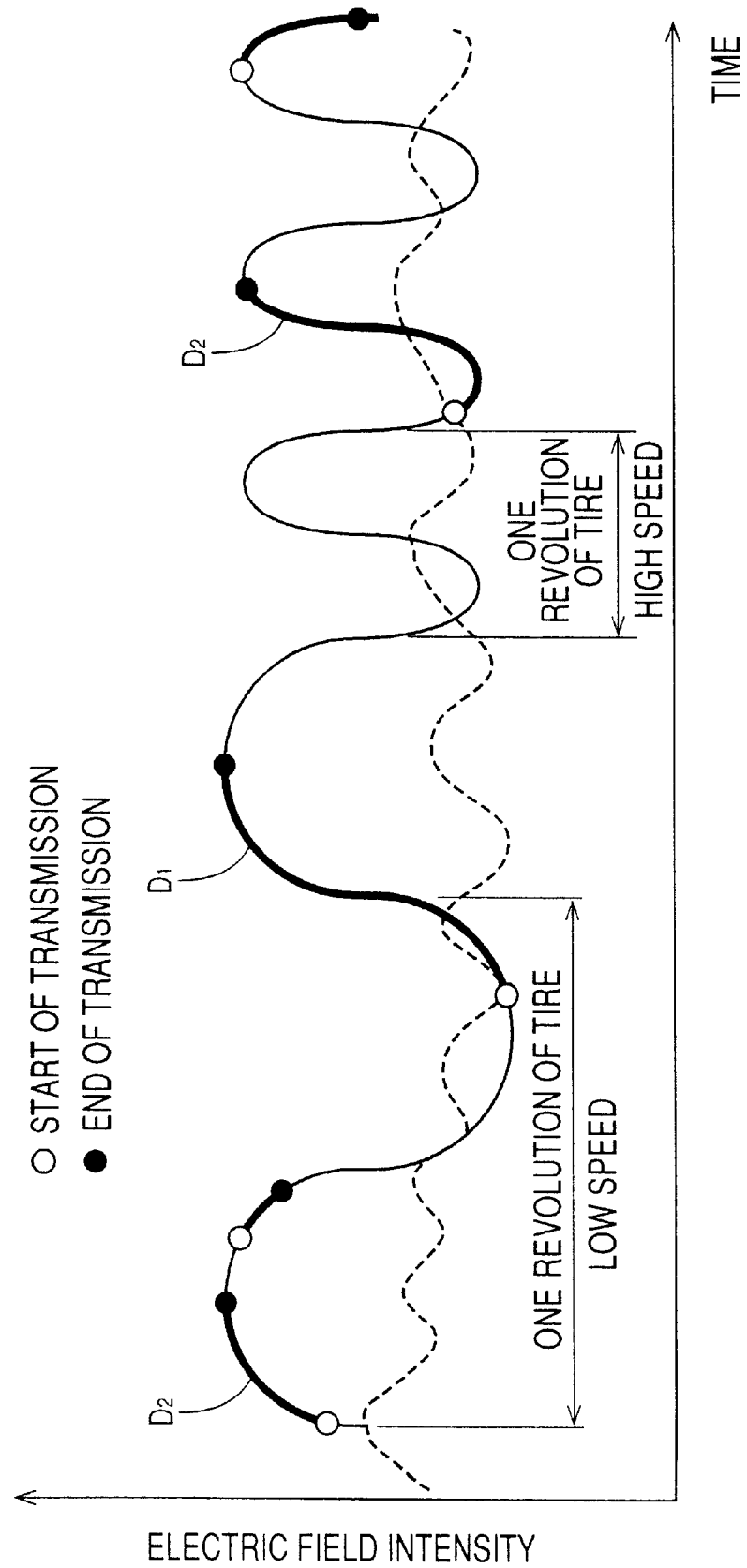
FIG. 14 is a view indicating a change in intensity of an electric field between a transmitter and a receiver of the vehicle wheel information supply device of FIG. 12.

Referring next to FIG. 12, there will be described a fourth embodiment of this invention which uses a wheel information generator 100 including a detailed wheel information generating portion 102, an abridged wheel information generating portion 104, and an abnormality information generating portion 106. To the input portion of the generator 100, there are connected not only the air pressure detector 12 and the tire temperature detector 14 but also a wheel speed detector 108. While the rotating speed of the wheel is relatively high, not only relatively long information D1 but also relatively short information D2, may not be correctly received due to a noise, as indicated in FIG. 14. Thus, the reception ratio of the wheel information tends to decrease with an increase in the rotating speed of the wheel 10. With this tendency taken into account, the present embodiment is adapted such that detailed wheel information and abridged wheel information are successively transmitted continuously when the detected tire air pressure is not lower than the preset value, and such that the detailed wheel information, the abridged wheel information and abnormality information are successively transmitted continuously when the detected tire air pressure is lower than the preset value. The ratio of reception of at least one of these two or three sets of information in the present embodiment is higher than the ratio of reception of only one of those sets of information which is selectively transmitted at a predetermined time interval depending upon the detected tire air pressure.

Described more specifically, the wheel information generator 100 is arranged to select and activate the detailed wheel information generating portion 102 and the abridged wheel information generating portion 104 when the detected tire air pressure is not lower than the preset value and is normal, and to select and activate the detailed wheel information generating portion 102, the abridged wheel information generating portion 104 and the abnormality information generating portion 106 when the detected tire air pressure is lower than the preset value and abnormal.

Figure 13:
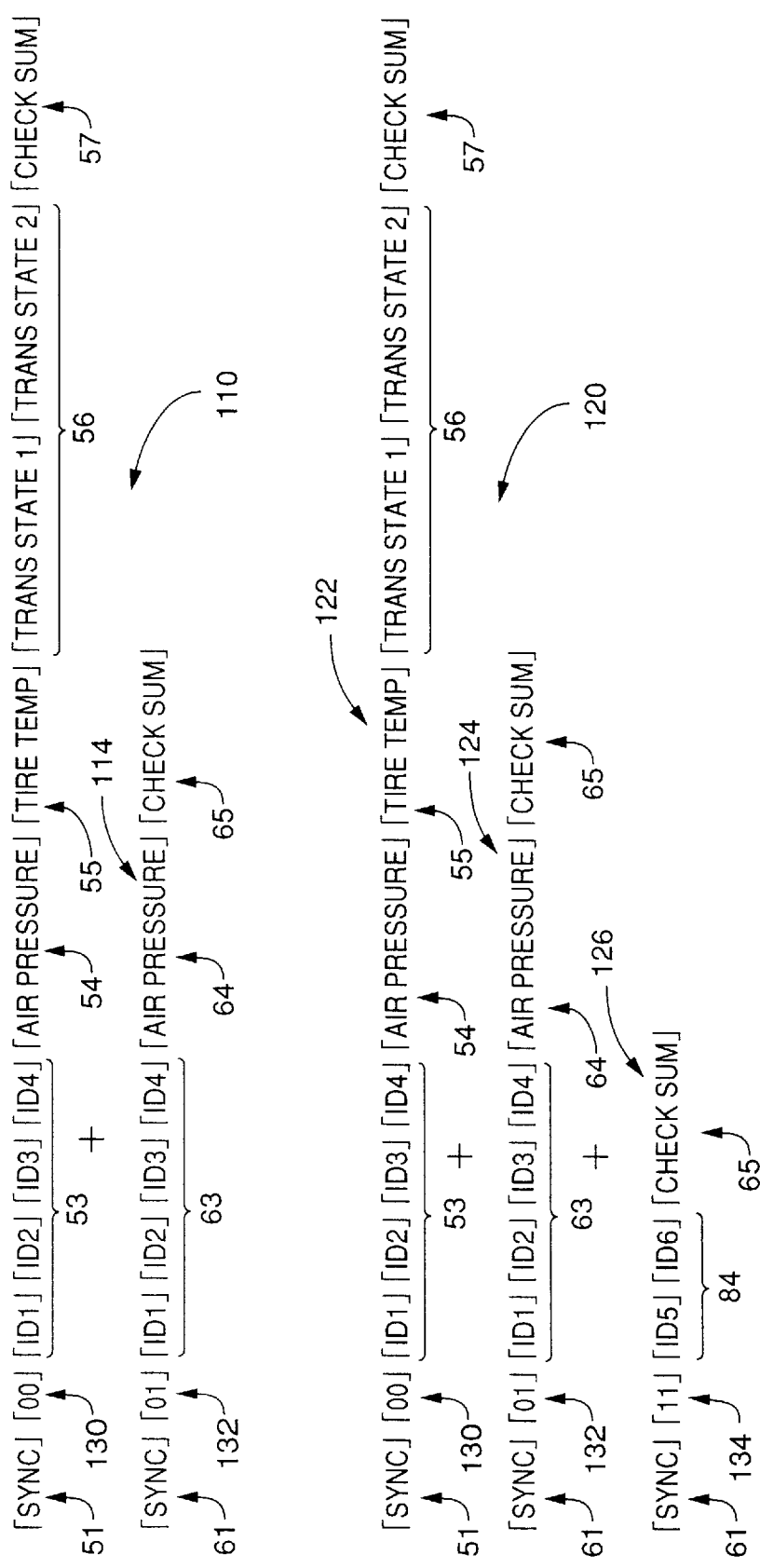
FIG. 13 is a view illustrating a series of wheel information generated by a wheel information generator device of the vehicle wheel information supply device of FIG. 12.

With the detailed and abridged wheel information generating portions 102, 104 being activated when the detected tire air pressure is normal, the wheel information generator 100 generates NORMAL wheel information 110 consisting of detailed wheel information 112 and abridged wheel information 114, as indicated in FIG. 13. The detailed wheel information 112, which is generated by the detailed wheel information generating portion 102, is the same as the NORMAL wheel information 50 shown in FIG. 4. The abridged wheel information 114, which is generated by the abridged wheel information generating portion 104, is the same as the ABRUPT TIRE PRESSURE REDUCTION wheel information 60 also shown in FIG. 4.

With the detailed and abridged wheel information generating portions 102, 104 and the abnormality information generating portion 106 being activated when the detected tire air pressure is abnormal, the wheel information generator 100 generates ABNORMAL wheel information 120 consisting of detailed wheel information 122, abridged wheel information 124, and abnormality information 126, as indicated in FIG. 13. The detailed wheel information 122 and the abridged wheel information 124, which are the same as the NORMAL wheel information 50, are generated by the detailed and abridged information generating portions 102, 104, respectively. The abnormality information 126, which is generated by the abnormality information generating portion 106, is the same as the ABRUPT TIRE PRESSURE REDUCTION wheel information 90 shown in FIG. 11.

Like the TRAILER data 52 described above, TRAILER data 130 included in the detailed wheel information 112, 122 represent the total volume of the information 112, 122, and indicate that the information 112, 122 is the detailed wheel information which includes both the AIR PRESSURE data 54 and the TIRE TEMPERATURE data 55. Similarly, TRAILER data 132 included in the abridged wheel information 114, 124 represent the total volume of the information 114, 124, and indicate that the information 114, 124 is the abridged wheel information which includes the AIR PRESSURE data 64 but does not include TIRE TEMPERATURE data. TRAILER data 134 included in the abnormality information 126 represent the total volume of the information 126, and indicate that the information 126 is the abnormality information which merely indicates that the tire air pressure is abnormal.

In the present fourth embodiment wherein the different kinds of information are successively and continuously transmitted, the ratio of reception of at least one of these kinds of information is higher than the reception ratio where one of different kinds of information is selectively transmitted with a predetermined cycle time. This arrangement assures a high degree of accuracy of detection of abnormality of the tire air pressure, and provides a possibility that the detailed wheel information is received by the receiver 28 even while the tire air pressure, so that the vehicle operator can be informed of the details of the wheel tire condition.

Like the first embodiment of FIG. 1, the fourth embodiment of FIGS. 12–13 is adapted such that the NORMAL wheel information 110 or the ABNORMAL wheel information 120 is selectively transmitted from the transmitter 18, depending upon the detected tire air pressure of the wheel 10. In this respect, the transmitter 18 may be considered to have a first and a second transmitting portion which are operated when the tire air pressure is normal and abnormal, respectively, so that the detailed wheel information 112 and the abridged wheel information 114 generated by the wheel information generator 100 are successively transmitted by the first transmitting portion when the tire air pressure is normal, and so that the detailed wheel information 122, the abridged wheel information 124 and the abnormality information 126 generated by the wheel information generator 100 are successively transmitted by the second transmitting portion when the tire air pressure is abnormal. In this case, the wheel information generator 100 may be adapted to generate all of the three different kinds of information 112 (122), 114 (124), 126, irrespective of whether the detected tire air pressure is lower than the preset value or not.

Figure 15:
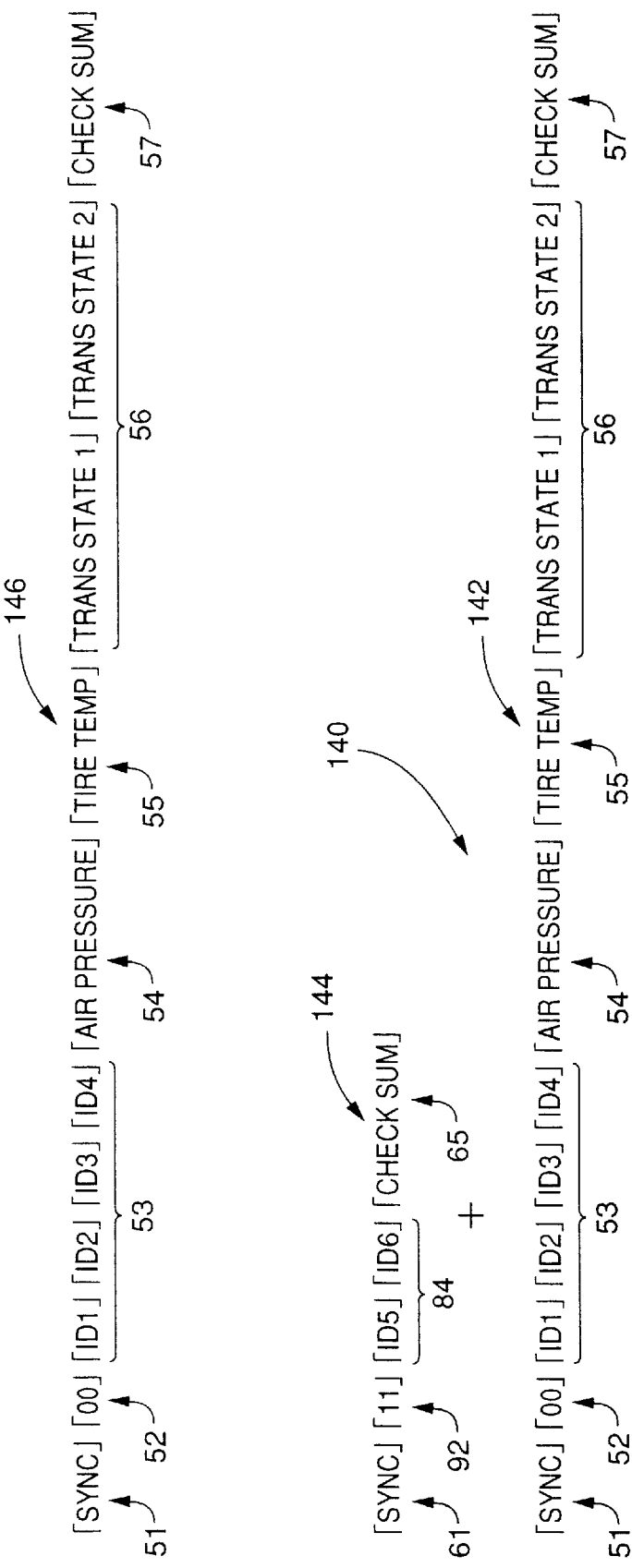
FIG. 15 is a view illustrating a series of wheel information generated by a wheel information generator device of a vehicle wheel information supply device according to a further embodiment of this invention.

The wheel information generator 100 may be modified to include only two of the detailed wheel information generating portion 102, the abridged wheel information generating portion 104, and the abnormality information generating portion 106. For instance, the generator 100 may include the detailed wheel information generating portion 102 and the abnormality information generating portion 106. In this case, the detailed wheel information generating portion 102 and the abnormality information generating portion 106 are both activated when the tire air pressure is abnormal, and only the detailed wheel information generating portion 102 is activated when the tire air pressure is normal. That is, ABNORMAL wheel information 140 consisting of detailed wheel information 142 and abnormality information 144 as shown in FIG. 15 is generated when the tire air pressure is abnormal, and NORMAL wheel information 146 consisting of only the detailed wheel information as also shown in FIG. 15 is generated when the tire air pressure is normal. When the different kinds of information are transmitted, they may be successively transmitted in any order. For instance, the detailed wheel information 142 may either precede or follow the abnormality information 144, provided the information 142 and the information 144 are successively transmitted.

While the embodiments described above uses both of the air pressure detector 12 and the tire temperature detector 14, only one of these detectors 12, 14 may be used. Further, a detector for detecting the shape (deformation) of the wheel tire may be provided in place of, or in addition to the detectors 12, 14. That is, the "wheel information" may include information relating to the shape of the tire or the amount or condition of deformation of the tire, as well as information relating to the air pressure of the tire, information relating to the rate of reduction of the tire air pressure, and information relating to the tire temperature.

The different information generating portions of the wheel information generator 16, 100 may be selectively activated, depending upon the rotating speed of the wheel 10. The reception ratio of the wheel information having a given volume decreases with an increase in the rotating speed of the wheel 10, as discussed above. In view of this, the wheel information generator 100 may be adapted such that the abridged wheel information generating portion 104 is activated when the wheel speed is higher than a predetermined upper limit, and the detailed wheel information generating portion 102 is activated when the wheel speed is not higher than the upper limit. The wheel speed detector 108 may include a centrifugal force detecting portion adapted to detect the centrifugal force which increases with an increase in the wheel speed. The centrifugal force detecting portion may be a piezoelectric element adapted to detect a radial force which acts on a weight disposed on the tire or a tire holding portion of the wheel. An electric output signal of the piezoelectric element represents the centrifugal force from which the rotating speed of the wheel can be obtained. For instance, an acceleration sensor may be used for the wheel speed detector 108. A strain gage may be used as the above-indicated centrifugal force detecting portion of the wheel speed detector 108.

Figure 16:
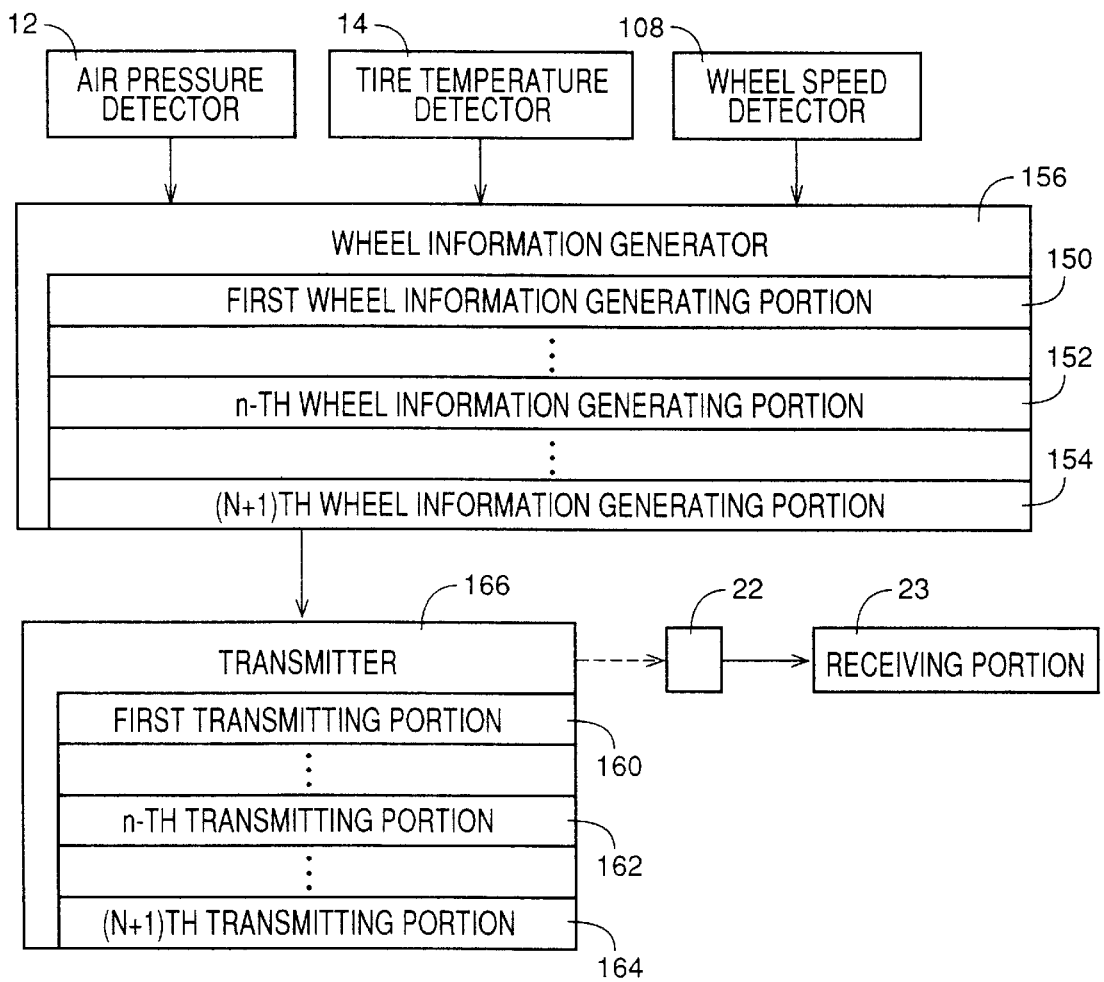
FIG. 16 is a block diagram showing a vehicle wheel information supply device according to a still further embodiment of this invention.
Figure 17:
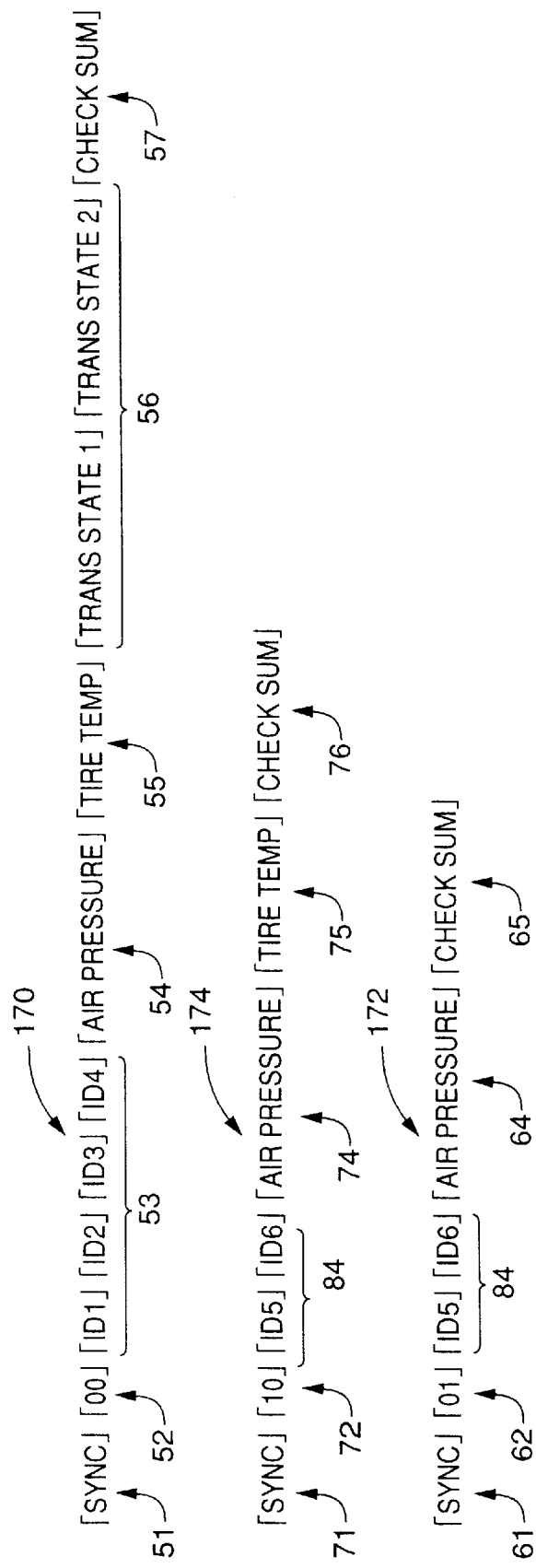
FIG. 17 is a view illustrating a series of wheel information generated by a wheel information generator of the vehicle wheel information supply device of FIG. 16.
Figure 18:
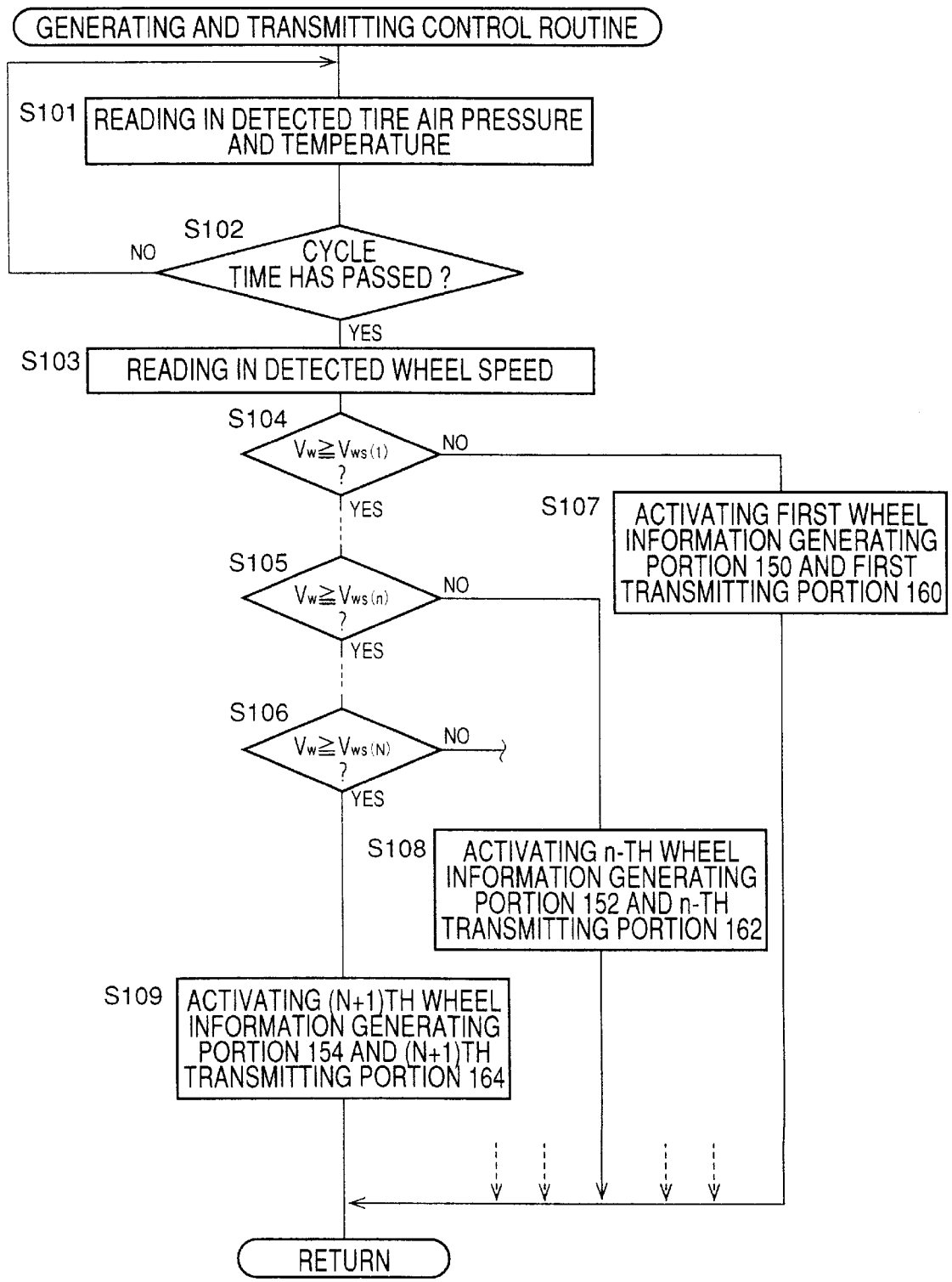
FIG. 18 is a flow chart illustrating a information generating and transmitting control routine executed by a program stored in the ROM of the wheel information generator of FIG. 17.
Figure 19:
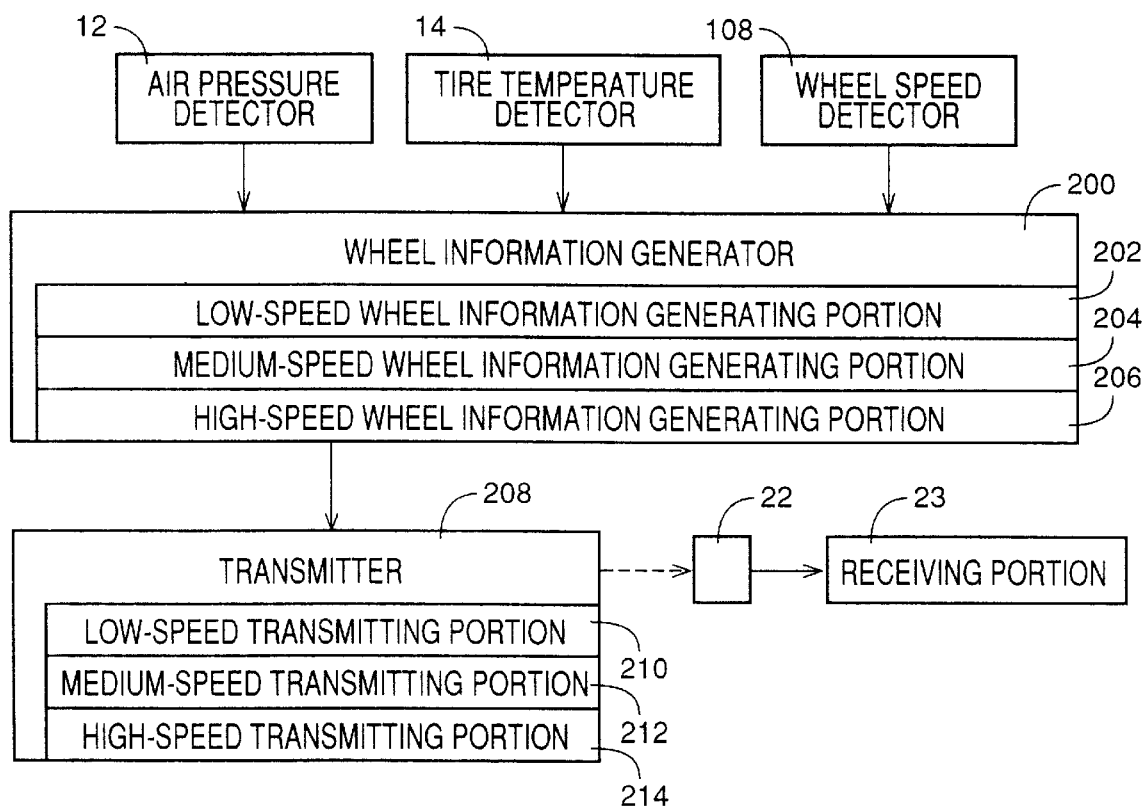
FIG. 19 is a block diagram showing a vehicle wheel information s ply device according to a yet further embodiment of this invention.

Referring to FIGS. 16–18, there will be described a sixth embodiment of the present invention wherein both the operation of the wheel information generator and the operation of the transmitter depend upon the rotating speed of the wheel.

As illustrated in FIG. 16, a wheel information supply device according to this sixth embodiment includes a wheel information generator 156 and a transmitter 166. The wheel information generator 156 includes a plurality of wheel information generating portions 150, 152, 154, and the transmitter 166 includes a plurality of transmitting portions 160, 162, 164.

In the present embodiment, only the first wheel information generating portion 150 and only the first transmitting portion 160 are activated when the wheel speed Vw is lower than a first threshold value Vws(1). The first wheel information generating portion 150 generates wheel information 170 shown in FIG. 17, and the first transmitting portion 160 transmits the wheel information 170 a predetermined number of times N(1). When the wheel speed Vw is equal to an N-th threshold value Vws(n) or higher, the (N+1)th wheel information generating portion 154 and the (N+1)th transmitting portion 164 are activated. The (N+1)th wheel information generating portion 154 generates wheel information 172 shown in FIG. 17, and the (N+1)th transmitting portion 164 transmits the wheel information 172 a predetermined number of times (N+1). When the wheel speed Vw is lower than a n-th threshold value Vws(n) and equal to or higher than a (n−1)th threshold value Vws(n−1), the n-th wheel information generating portion 152 and the n-th transmitting portion 162 are activated. The n-th wheel information generating portion 152 generates wheel information 174 shown in FIG. 17, and the n-th transmitting portion 162 transmits the wheel information 174 a predetermined number of times M(n). In the present sixth embodiment, both the wheel information generator 156 and the transmitter 166 are controlled depending upon the wheel speed Vw.

The n-th threshold value Vws(n) and the number of times M(n) increase while the volume of the wheel information decreases as the number "n" increases from "1" to "N". That is, as the wheel speed Vw increases, the volume of the wheel information to be transmitted is reduced and the number of times of transmission of the wheel information is increased.

The wheel information is transmitted with a predetermined cycle time, namely, at a predetermined time interval (e.g., Δt).

The operations of the wheel information generator 156 and the transmitter 166 will be described by reference to the flow chart of FIG. 18, which illustrates wheel information generating and transmitting control routine.

The routine of FIG. 18 is initiated with step S101 to read in the detected tire air pressure and tire temperature, which are respectively detected by the air pressure detector 12 and the tire temperature detector 14 with the predetermined cycle time Δt. Step S101 is followed by step S102 to determine whether a preset cycle time has passed. If an affirmative decision (YES) is obtained in step S102, the control flow goes to step S103 to read in the wheel speed Vw, and to steps S104–S106 to determine whether the detected wheel speed Vw is equal to or higher than each of n-th threshold value Vws(n), more specifically, to determine one of three wheel speed ranges in which the detected wheel speed Vw lies. The first range has an upper limit equal to the first threshold value Vws(1), and the second range is defined by a lower limit equal to the (n−1)th threshold value Vws(n−1) and an upper limit equal to the n-th threshold value Vws(n). The third range has a lower limit equal to the N-th threshold value Vws(N).

When the detected wheel speed Vw is lower than the first threshold value Vws(1), a negative decision (NO) is obtained in step S104, and the control flow goes to step S107 in which the first wheel information generating portion 150 and the first transmitting portion 170 are selected and activated, so that the first wheel information 170 generated by the first wheel information generating portion 150 is transmitted by the first transmitting portion 160 the predetermined number of times M(1).

When the detected wheel speed Vw is equal to or higher than the (n−1)th threshold value Vws(n−1) and is lower than the n-th threshold value Vws(n), an affirmative decision (YES) is obtained in step S104 while a negative decision (NO) is obtained in step S105, and the control flow goes to step S108 in which the n-th wheel information generating portion 152 and the n-th transmitting portion 162 are activated, so that the n-th wheel information 174 generated by the n-th wheel information generating device 152 is transmitted by the n-th transmitting portion 162 the predetermined number of times M(n).

When the detected wheel speed Vw is equal to or higher than the N-th threshold value Vws(N), an affirmative decision (YES) is obtained in steps S104, S105 and S106, and the control flow goes to step S109 in which the (N+1)th wheel generating portion 154 and the (N+1)th transmitting portion 164 are activated, so that the (N+1)th wheel information 172 generated by the (N+1)th wheel information generating portion 154 is transmitted by the (N+1)th transmitting portion 164 the predetermined number of times M(N+1).

In the present sixth embodiment, both the operation of the wheel information generator 156 and the operation of the transmitter 166 are controlled depending upon the wheel speed Vw such that the volume of the wheel information to be transmitted decreases while the number of times of transmission of the wheel information increases, as the wheel speed Vw increases. This arrangement is effective to prevent reduction in the reception ratio of the wheel information when the wheel speed Vw is relatively high.

The wheel information generator 156 need not include a plurality of wheel information generating portions (150, 152, 154) as provided in the above embodiment, provided the generator 156 is capable of generating different kinds of wheel information having respective different volumes. Similarly, the transmitter 166 need not include a plurality of transmitting portions, provided the transmitter 166 is capable of transmitting the wheel information different number of times.

If the sixth embodiment is adapted, the selected wheel information generating portion is operated only once to generate the corresponding wheel information, and the transmitter 166 transmits the same wheel information the predetermined number of times, without the wheel information being updated with a change in the wheel speed Vw. However, the selected wheel information generating portion may be operated the predetermined number of times so that the wheel information generated by each operation of the wheel information generating portion is transmitted. This arrangement permits updating of the wheel information with a change in the wheel speed Vw. It is also noted that the generated wheel information may be transmitted the predetermined number of times M(n), either continuously without a non-transmission time between the successive transmissions, or at a predetermined time interval with a non-transmission time between the successive transmissions. In the latter case, the frequency of transmission of the wheel information increases with a decrease in the volume of the wheel information.

Referring next to FIGS. 19–22, there will be described a seventh embodiment of this invention, which includes a wheel information generator 200 and a transmitter 208. The wheel information generator 200 includes a low-speed wheel information generating portion 202, a medium-speed wheel information generating portion 204 and a high-speed wheel information generating portion 206. The transmitter 208 includes a low-speed transmitting portion 210, a medium-speed transmitting portion 212 and a high-speed transmitting portion 214.

The low-speed, medium-speed and high-speed wheel information generating portions 202, 204, 206 respectively generate the first wheel information 170, the (N+1)th wheel information 174 and the n-th wheel information 172 as low-speed wheel information, medium-speed wheel information and high-speed wheel information. These generating portions 202, 204, 206 are all activated to generate the respective kinds of wheel information 170, 174, 172 with a predetermined cycle time.

The low-speed, medium-speed and high-speed transmitting portions 210, 212, 214 of the transmitter 208 are arranged to transmit the above-indicated three kinds of wheel information 170, 174, 172 according to respective three transmission patterns shown in FIG. 21. One of these three transmitting portions 210, 212, 214 is selected depending upon the detected wheel speed Vw. In all of the three transmission patterns (low-speed, medium-speed and high-speed transmission patterns), all of the three kinds of wheel information 170, 172, 174 are transmitted. However, the three transmission patterns have different proportions of the numbers of transmission of the individual kinds of wheel information per each transmitting operation of the transmitter 208. The transmission patterns are stored in the ROM of the transmitter 208.

One of the three transmitting portions 210, 212, 214 which operate according to the respective transmission patterns is selected and activated depending upon the detected wheel speed Vw, according to a transmitting portion selecting routine illustrated in the flow chart of FIG. 20.

The routine of FIG. 20 has steps S151, S152 and S153 which are identical with step S101, S102 and S103 in FIG. 18. Step S153 is followed by step S154 to determine one of three ranges in which the detected wheel speed Vw lies. Namely, when the wheel speed Vw is lower than a threshold Vs2, the control flow goes to step S155 to select and activate the low-speed transmitting portion 210, so that the low-speed transmitting portion 210 is operated according to the low-speed transmission pattern to first transmit the low-speed wheel information 170 a predetermined first number of times L1, then transmit the medium-speed wheel information 174 a predetermined second number of times L2, and finally transmit the high-speed wheel information 172. According to the low-speed transmission pattern, L1≧L2≧L3.

When the detected wheel speed Vw is equal to or higher than the threshold Vs2 and lower than a threshold Vs1, the control flow goes to step S156 to select and activate the medium-speed transmitting portion 212, so that the medium-speed transmitting portion 212 is operated according to the medium-speed transmission pattern to first transmit the low-speed wheel information 170 a predetermined first number of times M1, then transmit the medium-speed wheel information 174 a predetermined second number of times M2, and finally transmit the high-speed wheel information 172 a predetermined third number of times M3. According to the medium-speed transmission pattern, M2≧M1≧M3, or M2≧M3≧M1.

When the detected wheel speed Vw is equal to or higher than the threshold Vs1, the control flow goes to step S157 to select and activate the high-speed transmitting portion 214, so that the high-speed transmitting portion 214 is operated according to the high-speed transmission pattern to first transmit the low-speed wheel information 170 a predetermined first number of times H1, then transmit the medium-speed wheel information 174 a predetermined second number of times H2, and finally transmit the high-speed wheel information 172 a predetermined third number of times H. According to the high-speed transmission pattern, H1≦H2≦H3.

Figure 22:
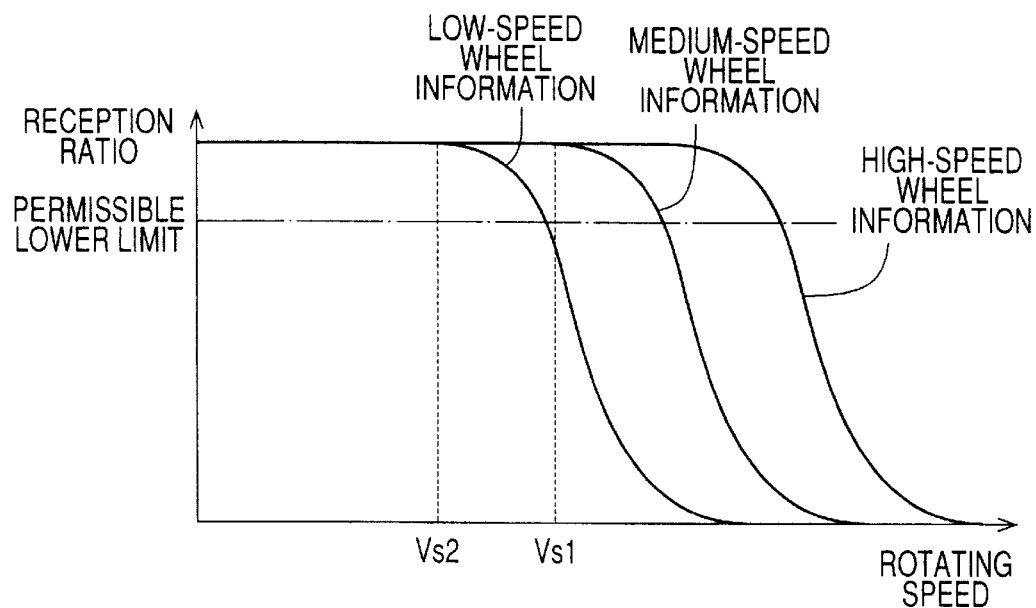
FIG. 22 is a graph indicating a relationship between the reception ratio of wheel information and the wheel rotating speed in the vehicle wheel information supply device of FIG. 19.

As explained above, the reception ratio of the wheel information decreases with an increase in the rotating speed of the wheel 10, and decreases with an increase in the volume of the wheel information while the wheel speed is constant. As indicated in FIG. 22, the wheel speed at which the reception ratio falls below a permissible lower limit decreases with an increase in the volume of the wheel information. When the wheel speed Vw is lower than the threshold Vs2, the low-speed wheel information 170 having a relatively large volume can be received with a relatively high reception ratio. When the wheel speed Vw is higher than the threshold Vs1, however, the reception ratio of the low-speed wheel information 170 is lowered below the permissible lower limit. On the other hand, the reception ratios of the medium-speed wheel information 174 and the high-speed wheel information 172 are higher than the permissible lower limit, even after the wheel speed Vw is higher than the threshold Vs1, until the wheel speed has increased to respective upper limits. Accordingly, the medium-speed wheel information 172 and high-speed wheel information 174 having relatively small volumes are transmitted when the wheel speed Vw is relatively high. In this case, the total volume of the wheel information is relatively small, and the number of items represented by the wheel information is reduced.

On the other hand, the reception ratio can be increased by increasing the number of transmissions of the wheel information. In this case, however, the required amount of electric energy is increased, and the service life of the battery used in the transmitter 208 is shortened.

In the present seventh embodiment wherein the different kinds of wheel information 170, 172, 174 are transmitted irrespective of the wheel speed Vw, the ratio of the number of the small-volume wheel information (172; 172, 174) to the number of the large-volume wheel information (170; 170, 174) is increased with an increase in the wheel speed Vw, so that the reception ratio is made relatively high even when the vehicle speed is relatively high. This arrangement has a possibility that the large-volume wheel information can be received when the vehicle speed is relatively high, so that the number of items represented by the received wheel information can be made relatively large even when the vehicle speed is relatively high.

Then, the numbers of times Ln, Mn and Hn (n=1, 2, 3) of transmission of the wheel information when the vehicle speed Vw is low, medium and high will be considered.

Where the following inequality relationships are satisfied, the proportions of the numbers of times of transmission of the three kinds of wheel information 170, 172, 174 when the vehicle speed is low, medium and high are different from each other:

L1>L2>L3

M2>M1>M3

H1<H2<H3

Where the numbers of times of transmission of the three kinds of wheel information 170, 172, 174 for each wheel speed range are equal to each other (L1=L2=L3, M2=M1=M3, H1=H2=H3), the proportions of the numbers of the three kinds of wheel information corresponding to the three wheel speed ranges are equal to each other. However, the transmission patterns can be made different for the three wheel speed ranges, if the total number of times L1, L2 and L3, the total number of times M2, M1, M3 and the total number of times H1, H2 and H3 are different from each other. For example, if the total number of times Mn and the total number of times Hn are larger than the total number of times Ln, the reception ratios of the medium-speed and high-speed wheel information 174, 172 can be increased. Even where the numbers of the three kinds of wheel information for each wheel speed range are equal to each other and the total numbers of times Ln, Mn, Hn are equal to each other, the different transmission patterns can be obtained for the three wheel speed ranges, if the transmission cycle times are different for the respective three wheel speed ranges.

Where two of the three numbers of times of transmission of the low-speed, medium-speed and high-speed wheel information 170, 174, 172 are equal to each other for each wheel speed range, for instance, where L1=L2>L3, M2>M1=M3, and H1<H2=H3, the proportions of the numbers of times of transmission for the three wheel speed ranges are different from each other.

It is also possible that the numbers of times of transmission of the three kinds of wheel information are equal to each other for one of the three wheel speed ranges, while those for the other speed ranges are different from each other. For instance, L1=L2=L3, M2>M1=M3, H1=H2<H3, or alternatively, L1=L2=L3, M2>M1>M3, H1<H2<H3. In this case, too, the proportions of the numbers of times of transmission of the three kinds of wheel information can be made different from each other.

Other combinations of transmission patterns for the three different wheel speed ranges may be employed.

In the seventh embodiment, the low-speed wheel information 170, medium-speed wheel information 174 and high-speed wheel information 172 are all generated and transmitted, irrespective of the wheel speed. However, all of the three kinds of wheel information need not be transmitted. Namely, at least one of L1, L2, L3, M1, M2, M3, H1, H2 and H3 may be zero. For improved reception ratio, M2, M3 and H3 are desirably "1" or larger. That is, it is desirable to transmit the medium-speed wheel information 174 and the high-speed wheel information 172 when the wheel speed is in the medium range, and transmit the high-speed wheel information 172 when the wheel speed is in the high range.

Further, the order of transmission of the three kinds of wheel information 170, 174, 172 can be changed depending upon the detected wheel speed Vw. That is, the low-speed wheel information 170 is initially transmitted when the wheel speed is in the low range, and the medium-speed wheel information 174 is initially transmitted when the wheel speed is in the medium range. Further, the high-speed wheel information 172 is initially transmitted when the wheel speed is in the high range. When the same wheel information (e.g., 170) is transmitted two or more times, the transmissions need not be successive, and the different kinds of wheel information 170, 172, 174 may be transmitted at random. For instance, the wheel information 170 may be transmitted immediately before and after the wheel information 174.

FIG. 23 shows a combination of generation patterns for the three different wheel speed ranges, according to an eighth embodiment of the invention. In this case, each of the three kinds of wheel information generated is transmitted only once or a predetermined number of times, according to a predetermined rule. When the wheel speed is in the low range, the low-speed wheel information 170, the medium-speed wheel information 174 and the high-speed wheel information 172 are generated in this order. When each of these three kinds of information 170, 174, 172 is generated, it is transmitted. When the wheel speed is in the medium range, the medium-speed wheel information 174, the high-speed wheel information 172 and the low-speed wheel information 170 are generated in this order. When the wheel speed is in the high range, the high-speed wheel information 172, the medium-speed wheel information 174 and the low-speed wheel information 170 are generated in this order. The wheel information is generated and transmitted with the predetermined cycle time Δt, so that the wheel information received can be updated with a change in the wheel condition (tire air pressure).

While the presently preferred embodiments of this invention have been described above, for illustrative purpose only, it is to be understood that the invention may be embodied with various changes, modifications and improvements, which may occur to those skilled in the art, in the light of the foregoing teachings including those described in the SUMMARY OF THE INVENTION.

What is claimed is:

1. A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of said wheel state detector, a transmitter for transmitting said wheel information, and a receiver which receives said wheel information transmitted by said transmitter, said wheel state detector, said wheel information generator and said transmitter being disposed on said wheel while said receiver being disposed on a body of said vehicle, wherein an improvement comprises:

said wheel information generator being capable of selectively generating wheel information having respective different volumes, at least one of said wheel information generator and said transmitter operating in a manner which changes depending upon at least one parameter indicative of said state of said wheel, which at least one parameter is detected by said wheel state detector.

2. A vehicle wheel information supply device according to claim 1, wherein said wheel information generator operates in a manner which changes depending upon said at least one parameter indicative of the state of said wheel detected by said wheel state detector.

3. A vehicle wheel information supply device according to claim 1, wherein said wheel information generator comprises a first wheel information generating portion for generating first wheel information having a first volume, and a second wheel information generating portion for generating second wheel information having a second volume smaller than said first volume, said first and second wheel information generating portions being activated to generate said first wheel information and said second wheel information as said wheel information, depending upon said at least one parameter indicative of said state of said wheel detected by said wheel state detector.

4. A vehicle wheel information supply device according to claim 3, wherein said second wheel information generating portion is activated when a value of each of said at least one parameter becomes larger or smaller than a predetermined threshold, said at least one parameter being selected from a plurality of parameters including a rotating speed of said wheel.

5. A vehicle wheel information supply device according to claim 3, wherein said at least one parameter includes a rotating speed of said wheel, and said second wheel information generating portion is activated when said rotating speed of the wheel becomes higher than a predetermined threshold.

6. A vehicle wheel information supply device according to claim 3, wherein said wheel information generator further comprises commanding means for activating said second wheel information generating portion when a value of each of said at least one parameter becomes larger or smaller than a predetermined threshold, said at least one parameter being selected from a plurality of parameters including a rotating speed of said wheel.

7. A vehicle wheel information supply device according to claim 3, wherein said first and second wheel information generating portions are both activated to generate said first wheel information and said second wheel information when a value of each of said at least one parameter becomes larger or smaller than a predetermined threshold, said at least one parameter being selected from a plurality of parameters including a rotating speed of said wheel, said transmitter transmitting said first and second wheel information successively to said receiver.

8. A vehicle wheel information supply device according to claim 3, wherein said second wheel information generating portion is activated when said at least one parameter detected by said wheel state detector indicates an abnormal state of said wheel, said second wheel information including abnormality data indicative of said abnormal state of said wheel and not including any wheel state quantity data indicative of the state of the wheel.

9. A vehicle wheel information supply device according to claim 1, wherein said wheel information include at least one kind of information each of which includes primary information indicative of the state of said wheel, and ancillary information, said primary information and said ancillary information being transmitted by said transmitter as a unit of information.

10. A vehicle wheel information supply device according to claim 9, wherein said ancillary information include header/trailer information indicative of at least one of opposite ends of said unit of information.

11. A vehicle wheel information supply device according to claim 1, wherein at least one of said wheel information generator and said transmitter operates in one of a plurality of different modes which is selected depending upon a rotating speed of said wheel which is detected by said wheel state detector.

12. A vehicle wheel information supply device according to claim 1, wherein said wheel information generator comprises normal-frequency wheel information generating portion for generating the wheel information at a predetermined first frequency, and a high-frequency wheel information generating portion for generating the wheel information at a predetermined second frequency higher than said first frequency, said first and second wheel information generating portions being activated to generate said first wheel information and said second wheel information as said wheel information, depending upon said at least one parameter indicative of said state of said wheel detected by said wheel state detector.

13. A vehicle wheel information supply device according to claim 1, wherein said transmitter operates in a manner which changes depending upon said at least one parameter indicative of the state of said wheel detected by said wheel state detector.

14. A vehicle wheel information supply device according to claim 1, wherein said transmitter comprises transmission controlling means for controlling the number of times of transmission of said wheel information such that said number of times of transmission is larger when a value of each of said at least one parameter indicative of the state of said wheel detected by said wheel state detector is larger or smaller than a predetermined threshold, than when said value is not larger or smaller than said predetermined threshold, said at least one parameter being selected from a plurality of parameters including a rotating speed of said wheel.

15. A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of said wheel state detector, a transmitter for transmitting said wheel information, and a receiver which receives said wheel information transmitted by said transmitter, said wheel state detector, said wheel information generator and said transmitter being disposed on said wheel while said receiver being disposed on a body of said vehicle, wherein an improvement comprises:

said wheel information generator being capable of generating wheel information having respective different volumes; and said wheel information generator including a wheel information supply control device for controlling at least one of an operation of said wheel information generator and an operation of said transmitter, for thereby controlling a condition in which said wheel information is supplied, depending upon at least one parameter indicative of said state of said wheel, which at least one parameter is detected by said wheel state detector.

16. A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of said wheel state detector, a transmitter for transmitting said wheel information, and a receiver which receives said wheel information transmitted by said transmitter, said wheel state detector, said wheel information generator and said transmitter being disposed on said wheel while said receiver being disposed on a body of said vehicle, wherein an improvement comprises:

said wheel information generator including an information volume changing device for changing a volume of said wheel information depending upon at least one parameter indicative of the state of said wheel, which at least one parameter is detected by said wheel state detector.

17. A vehicle wheel information supply device according to claim 3, wherein said wheel state detector includes an air pressure detector for detecting an air pressure in a tire of said wheel, and said wheel information includes air pressure data relating to the air pressure detected by said air pressure detector.

18. A vehicle wheel information supply device according to claim 17, wherein said second wheel information generating portion is activated to generate said second wheel information when a rate of reduction of said air pressure detected by said air pressure detector is higher than a predetermined threshold.

19. A vehicle wheel information supply device according to claim 17, wherein said second wheel information generating portion is activated to generate said second wheel information when said air pressure detected by said air pressure detector is lower than a preset value.

20. A vehicle wheel information supply device according to claim 17, wherein said second wheel information generating portion is activated to generate said second wheel information when a state of reduction of said air pressure detected by said air pressure detector is abnormal and an operator of the vehicle must be informed of this abnormal state of reduction of the air pressure, said second wheel information including tire pressure abnormality data indicative of said abnormal state of reduction of the air pressure and not including any data indicative of said air pressure detected by said air pressure detector.

21. A vehicle wheel information supply device according to claim 17, wherein said first wheel information generating portion and said second wheel information generating portion are activated to generate said first wheel information and said second wheel information, respectively, when a state of reduction of said air pressure detected by said air pressure detector is abnormal and an operator of the vehicle must be informed of this abnormal state of reduction of the air pressure, said first wheel information including both data indicative of said air pressure detected by said air pressure detector and tire air pressure abnormality data indicative of said abnormal state of reduction of the air pressure, said second wheel information including said tire air pressure abnormality data indicative of said abnormal state of reduction of the air pressure and not including data indicative of said air pressure, said transmitter transmitting to said receiver said first wheel information and said second wheel information successively.

22. A vehicle wheel information supply device according to claim 17, wherein said wheel state detector further includes a tire temperature detector for detecting a temperature of a tire of said wheel, and said first wheel information is a unit of information consisting of (a) primary information including said air pressure data and tire temperature data indicative of the temperature of said tire, and (b) ancillary information, while said second wheel information is a unit of information consisting of (c) primary information including said air pressure data and not including said tire temperature data and (d) ancillary information.

23. A vehicle wheel information supply device according to claim 17, wherein said wheel information generator includes high-frequency wheel information generating portion for generating the wheel information at a higher frequency when a value of each of at least one parameter relating to said air pressure of the tire of said wheel detected by said air pressure detector is larger or smaller than a predetermined threshold, than when said value is not larger or smaller than said predetermined threshold.

24. A vehicle wheel information supply device according to claim 17, wherein said transmitter operates in a manner which changes depending upon at least one of said air pressure of the tire of said wheel and a rotating speed of said wheel.

25. A vehicle wheel information supply device according to claim 17, wherein said transmitter comprises transmission controlling means for controlling the number of times of transmission of said wheel information such that said number of times of transmission is larger when a value of each of at least one parameter relating to said air pressure of the tire of said wheel is larger or smaller than a predetermined threshold, than when said value of each of said at least one parameter relating to said air pressure is not larger or smaller than said predetermined threshold.

26. A vehicle wheel information supply device for supplying wheel information relating to a state of a wheel of a vehicle, including an air pressure detector for an air pressure in a tire of said wheel, an air pressure information generator for generating air pressure information relating to the air pressure of the wheel, on the basis of an output of said air pressure detector, a transmitter for transmitting said air pressure information, and a receiver which receives said air pressure information transmitted by said transmitter, said air pressure detector, said air pressure information generator and said transmitter being disposed on said wheel while said receiver being disposed on a body of said vehicle, wherein said air pressure information generator includes an information volume changing device for changing a volume of said air pressure information depending upon at least one parameter relating to the air pressure of said wheel, which at least one parameter is detected by said air pressure detector.

27. A vehicle wheel information supply device according to claim 1, wherein said receiver includes a controller for changing a mode of operation of said receiver from a reception standby mode to a registration mode when said receiver receives a registration mode signal received from said transmitter, said receiver normally processing said wheel information received from said transmitter when said receiver is placed in said reception standby mode, and registering identification data received from said transmitter when said receiver is placed in said registration mode, said wheel information including said identification data which identify said transmitter.

28. A vehicle wheel information supply device according to claim 27, wherein said transmitter transmits said registration mode signal to said receiver while said receiver is incapable of receiving information from a transmitter provided on a wheel of another vehicle and when the vehicle wheel information supply device is placed in a predetermined state.

29. A vehicle wheel information supply device according to claim 28, wherein said transmitter transmits said identification data following said registration mode signal, so that said identification data are registered in said receiver immediately after said registration mode is established by said controller according to said registration mode signal.

30. A vehicle wheel information supply device for supplying wheel information relating to a state of a wheel of a vehicle, including a wheel state detector for detecting the state of the wheel, a wheel information generator for generating the wheel information relating to the state of the wheel, on the basis of an output of said wheel state detector, a transmitter for transmitting said wheel information, and a receiver which receives said wheel information transmitted by said transmitter, said wheel state detector, said wheel information generator and said transmitter being disposed on said wheel while said receiver being disposed on a body of said vehicle, said vehicle wheel information supply device being characterised in that:

said wheel information generator comprises a first wheel information generating portion for generating first wheel information having a first volume, and a second wheel information generating portion for generating second wheel information having a second volume smaller than said first volume, at least one of said first and second wheel information generating portions being activated to generate at least one of said first wheel information and said second wheel information, depending upon at least one parameter indicative of said state of said wheel, which at least one parameter is detected by said wheel state detector.

31. A vehicle wheel state indicator comprising:

a vehicle wheel information supply device according to claim 1; and an information output device informing an operator of the vehicle, of the state of said wheel, on the basis of said wheel information received by said receiver of said vehicle wheel information supply device.

32. A vehicle wheel tire abnormality indicating device comprising:

a vehicle wheel information supply device according to claim 17; and an indicating device informing an operator of the vehicle that the air pressure in the tire is abnormal, when said receiver receives said second wheel information which include tire abnormality data indicating that a state of reduction of said air pressure detected by said air pressure detector or temperature detected by said temperature detector is abnormal.

* * * * *